United States Patent [19]
Morii et al.

[11] Patent Number: 5,992,007
[45] Date of Patent: Nov. 30, 1999

[54] APPARATUS FOR COVERING PERMANENT MAGNETS ON MOTOR ROTOR WITH CYLINDRICAL SLEEVE

[75] Inventors: Kenji Morii, Tanashi; Atsushi Kitajima, Utsunomiya; Mamoru Sasaki, Sayama; Tokio Kikuchi, Sakado, all of Japan

[73] Assignee: Honda Giken Kogyo Kabushiki Kaisha, Tokyo, Japan

[21] Appl. No.: 08/839,370

[22] Filed: Apr. 18, 1997

[30] Foreign Application Priority Data

Apr. 19, 1996 [JP] Japan ................................. 8-098746
Apr. 19, 1996 [JP] Japan ................................. 8-098751
Apr. 24, 1996 [JP] Japan ................................. 8-102866

[51] Int. Cl.⁶ ................................................ H02K 15/14
[52] U.S. Cl. .............................. 29/705; 29/598; 29/736; 29/446; 29/407.05
[58] Field of Search ......................... 29/598, 596, 732, 29/736, 447, 446, 705, 407.05

[56] References Cited

FOREIGN PATENT DOCUMENTS 55-111645  8/1980  Japan .
7-336966  12/1995  Japan .

*Primary Examiner*—Carl E. Hall
*Attorney, Agent, or Firm*—Birch, Stewart, Kolasch & Birch, LLP

[57] ABSTRACT

An apparatus for covering a plurality of permanent magnets on a rotor with a cylindrical sleeve has a movable jig, a holder jig having a plurality of insertion grooves for inserting therein the permanent magnets disposed in grooves of the rotor, the holder jig and the movable jig being pressable partly into an insertion end of the cylindrical sleeve, a plurality of resilient members disposed in the insertion grooves for pressing the permanent magnets against the outer circumferential surface of the rotor, and a presser device for inserting the movable jig, together with the rotor and the permanent magnets into the cylindrical sleeve under the guidance of the holder jig. The permanent magnets on the rotor are reliably and efficiently covered with the cylindrical sleeve without the need for an adhesive to secure the permanent magnets to the rotor.

18 Claims, 32 Drawing Sheets

F I G.23
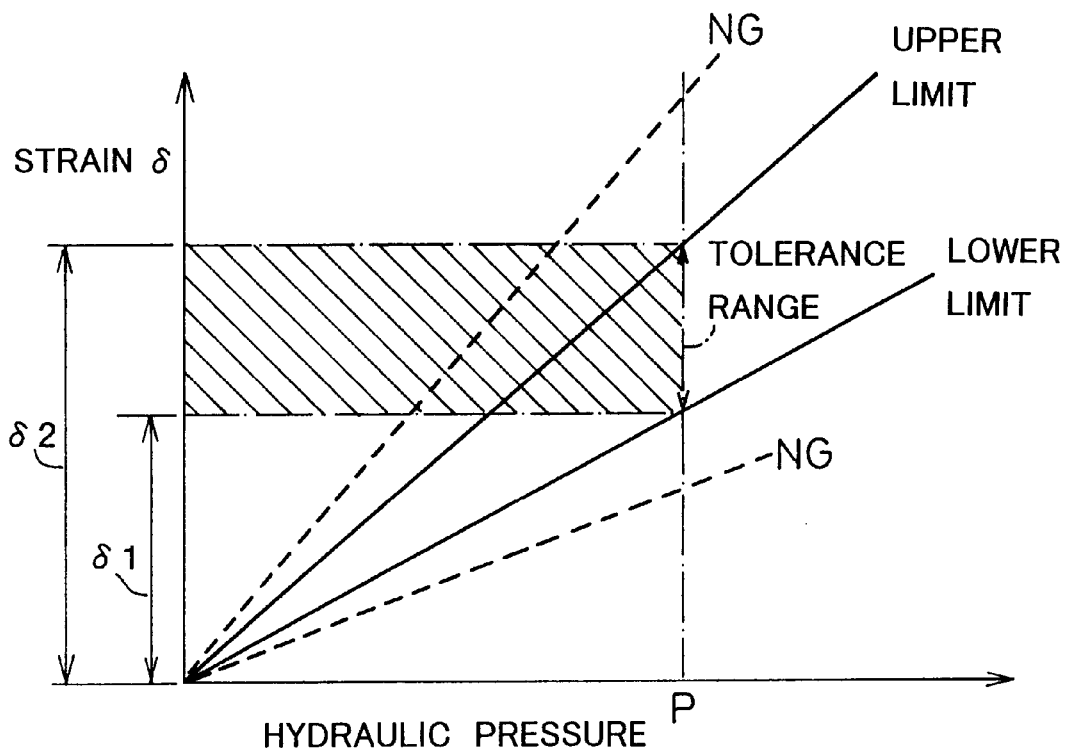

1

APPARATUS FOR COVERING PERMANENT MAGNETS ON MOTOR ROTOR WITH CYLINDRICAL SLEEVE

BACKGROUND OF THE INVENTION

1. Field of the Invention

The present invention relates to a method of and an apparatus for covering permanent magnets of a motor rotor with a cylindrical sleeve.

2. Description of the Related Art

Electric motors generally comprise a stator core having as many windings as the number of phases and a rotor rotatably disposed in the stator core and having a plurality of permanent magnets disposed on its outer circumferential surface. The rotor has a shaft and a yoke with the permanent magnets positioned at angularly spaced intervals on the outer circumferential surface of the yoke. The permanent magnets are covered with a cylindrical sleeve made of fiber-reinforced synthetic resin and held against the outer circumferential surface of the yoke.

In order to keep the permanent magnets firmly against the outer circumferential surface of the yoke, it is necessary that the cylindrical sleeve be securely held in intimate contact with the permanent magnets. To meet such a requirement, the diameter of the cylindrical member is considerably smaller than the diameter of the rotor. Therefore, it is a tedious and time-consuming task to install the cylindrical member on the yoke to cover the permanent magnets.

Japanese laid-open patent publication No. 55-111645 discloses an automatic magnet inserting device which comprises means for transferring an array of unmagnetized magnets to a magnetizing position, means for magnetizing the transferred magnets to a predetermined magnetized state in the magnetizing position, means for converting the shape of the magnetized magnets to a cylindrical shape, and means for pushing the cylindrical assembly of the magnets in an axial direction thereof and simultaneously inserting the magnets into a rotor case.

According to the disclosed automatic magnet inserting device, the magnets are simultaneously inserted into the rotor case with a jig and secured in position by an adhesive. To hold the magnets intimately against the outer circumferential surface of the yoke, the yoke has to be pressed into the magnets that have been fixedly positioned in the rotor case. Such a process of pressing the yoke into the magnets is cumbersome. The cost of rotors manufactured by the automatic magnet inserting device cannot be reduced because of the use of the adhesive for securing the magnets.

According to Japanese laid-open patent publication No. 7-336966, there is known a process of covering permanent magnets with a cylindrical member by forcibly spreading the cylindrical member radially outwardly under a fluid pressure, inserting a rotor and the permanent magnets into the cylindrical member, and then discharging the fluid.

The disclosed process will be described below with reference to FIGS. 33A and 33B of the accompanying drawings. As shown in FIG. 33A, a rotor 2 and permanent magnets 3 are supported by a holder jig 4 and a movable jig 5. A cylindrical sleeve 6 is disposed in a casing 7 and has an end spread and gripped by an O-ring 8 mounted in the casing 7, the holder jig 4, and the movable jig 5.

A fluid is introduced into the casing 7 to spread the cylindrical sleeve 6 radially outwardly under a fluid pressure. Then, the rotor 2 and the permanent magnets 3 are inserted together with the movable jig 5 into the cylindrical sleeve 6.

2

When the movable jig 5 is inserted into the cylindrical sleeve 6, the cylindrical sleeve 6 is contracted radially inwardly between the movable jig 5 and the holder jig 4, and pulled to a straight shape between teeth 4a of the holder jig 4, as show in FIG. 33B. The permanent magnets 3 inserted together with the movable jig 5 into the cylindrical sleeve 6 are held in sliding contact with the straight portions of the cylindrical sleeve 6. Therefore, surfaces of the permanent magnets 3 and the cylindrical sleeve 6 are liable to be damaged due to the frictional engagement therebetween.

Cylindrical members often have mechanical strength variations. A cylindrical member which tends to stretch under a given pressure is unable to impose tightening forces that are required to prevent permanent magnets from being displaced off the rotor. On the other hand, a cylindrical member which is less likely to stretch under a given pressure exerts resistance to the insertion of permanent magnets into the cylindrical member. Even if the permanent magnets can be covered with the cylindrical member, the cylindrical member will be cracked by centrifugal forces developed when the rotor rotates upon energization of the motor.

SUMMARY OF THE INVENTION

It is a general object of the present invention to provide a method of and an apparatus for covering permanent magnets mounted on a rotor firmly and efficiently with a cylindrical member without the need for an adhesive.

A principal object of the present invention is to provide an apparatus for covering permanent magnets mounted on a rotor efficiently with a cylindrical member while preventing the rotor magnets from being brought into sliding contact with the cylindrical member when the rotor magnets are inserted into the cylindrical member.

Another object of the present invention is to provide a method of and an apparatus for covering permanent magnets mounted on a rotor firmly and efficiently with a cylindrical member which can exert predetermined tightening forces.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 23 is a diagram showing a tolerance range of a strain evaluating device of the covering apparatus according to the third embodiment;

DETAILED DESCRIPTION OF THE PREFERRED EMBODIMENTS

Figure 1:
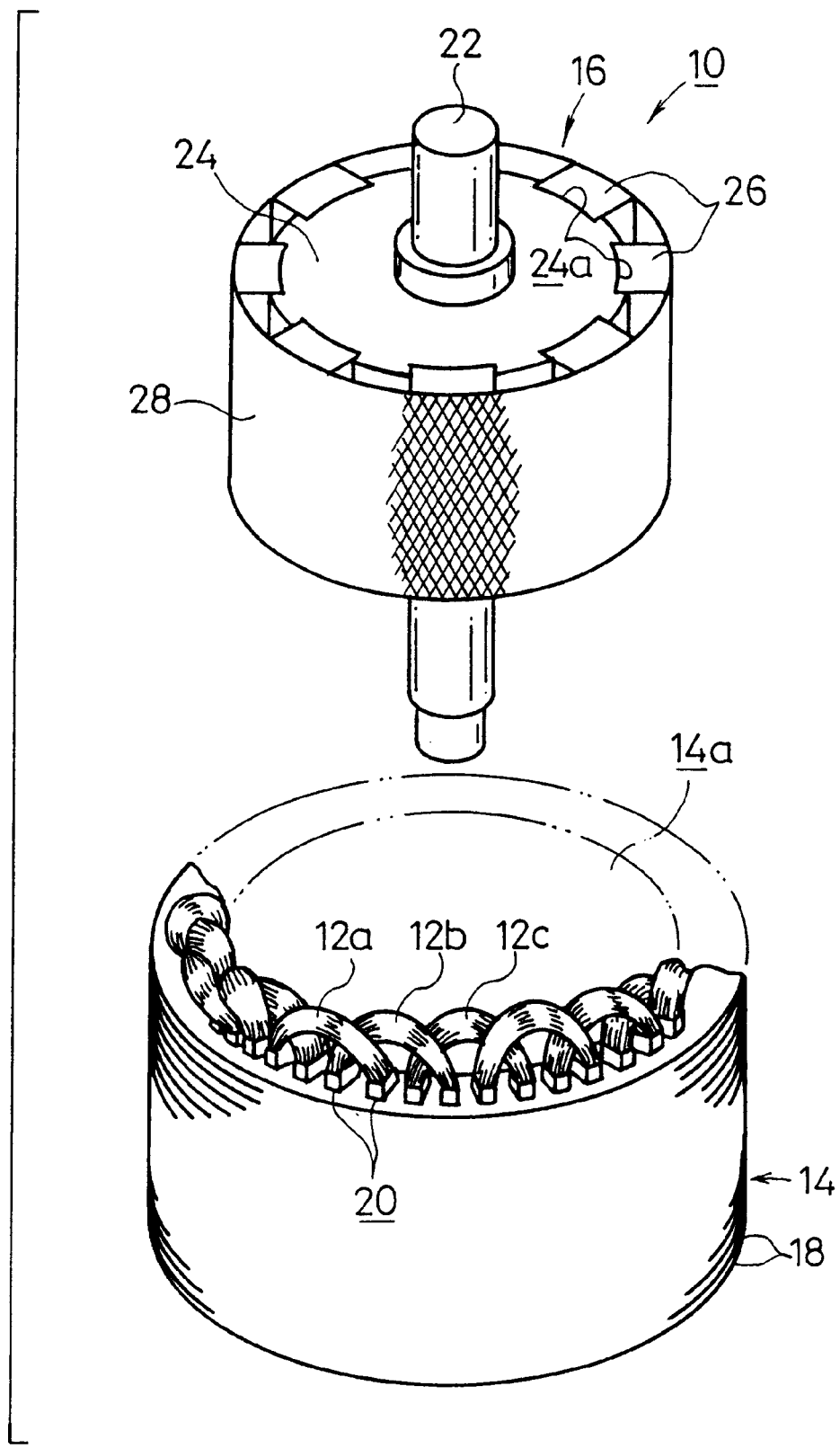
FIG. 1 is an exploded perspective view of an electric motor having a rotor whose permanent magnets are covered with a cylindrical member by a covering method and a covering apparatus according to a first embodiment of the present invention.

FIG. 1 shows in exploded perspective an electric motor 10 having a rotor whose permanent magnets are covered with a cylindrical member by a covering method and a covering apparatus according to a first embodiment of the present invention.

As shown in FIG. 1, the electric motor 10 comprises a stator core 14 having three-phase windings 12a~12c and a rotor 16 rotatably disposed in a hollow space 14a in the stator core 14.

The stator core 14 comprises a plurality of laminated steel sheets 18 bonded together and has a plurality of slots 20 defined at angularly spaced intervals in an inner circumferential surface thereof and extending parallel to each other in the axially direction thereof, with the windings 12a~12c being received in the slots 20.

The rotor 16 comprises a shaft 22 and a yoke 24 mounted on the shaft 22. The yoke 24 has a plurality of grooves 24a defined at angularly spaced intervals in an outer circumferential surface thereof. The rotor 16 also has a plurality of permanent magnets 26 mounted respectively in the grooves 24a. A cylindrical sleeve 28 is installed on the rotor 16 in covering relation to the permanent magnets 26 by a covering apparatus 30 (see FIG. 5) according to the first embodiment of the present invention. The cylindrical sleeve 28 comprises a circularly wound sheet of fiber-reinforced synthetic resin.

Figure 2:
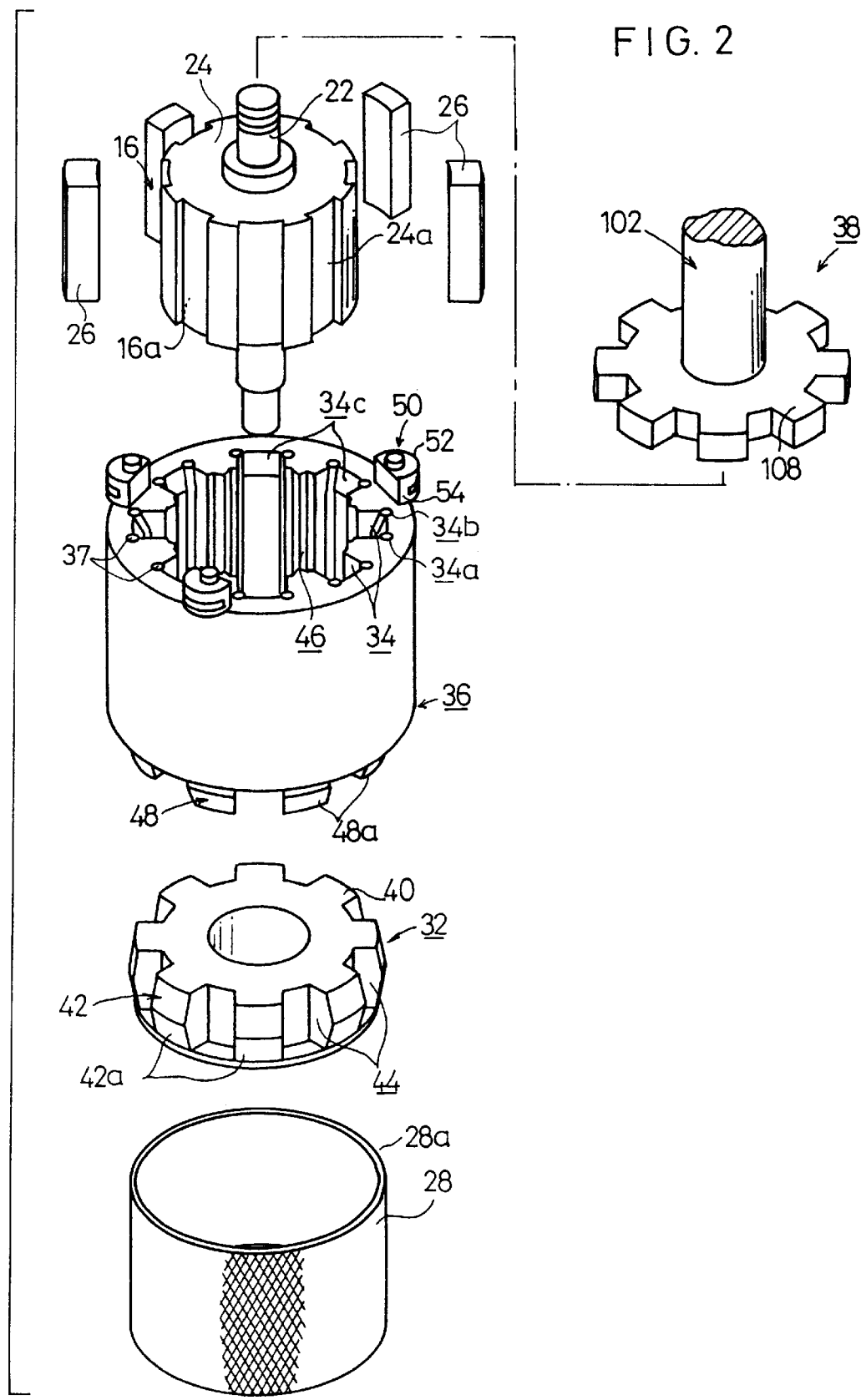
FIG. 2 is an exploded perspective view of the covering apparatus according to the first embodiment.

As shown in FIG. 2, the covering apparatus 30 according to the first embodiment includes a movable jig 32 for positioning and supporting an end face 16a of the rotor 16, and a holder jig 36 has a plurality of insertion grooves 34 for inserting therein the permanent magnets 26 disposed in the grooves 24a of the rotor 16. The holder jig 36 and the movable jig 32 are pressable together into an insertion end 28a of the cylindrical member 28 for spreading the insertion end 28a radially outwardly to a diameter greater than the diameter of a circle corresponding to inner wall surfaces of the insertion grooves 34. A plurality of resilient members 37 are placed in the insertion grooves 34 for resiliently pressing the permanent magnets 26 against the outer circumferential surface of the rotor 16. A presser device 38 is for inserting the movable jig 32, together with the rotor 16 and the permanent magnets 26, into the cylindrical sleeve 28 under the guidance of the holder jig 36 while the rotor 16 and the permanent magnets 26 are engaging the movable jig 32.

The movable jig 32 is of a substantially disk shape and has an engaging surface 40 for placing the end face 16a of the rotor 16 thereon and a plurality of first teeth 42 projecting radially outwardly for positional alignment with the respective permanent magnets 26, with recesses 44 being defined between the first teeth 42. The first teeth 42 have their radially outermost edges circumscribed by a circle whose diameter is selected to spread the cylindrical sleeve 28 radially outwardly to a diameter greater than the diameter of a circle corresponding to inner wall surfaces of the insertion grooves 34. The first teeth 42 have smaller-diameter tapered surfaces 42a on their outer tip ends. The tapered surfaces 42a are progressively reduced in diameter in the direction in which the movable jig 32 is inserted into the cylindrical sleeve 28.

The holder jig 36 is of a substantially cylindrical shape whose axial length corresponds to the length of the permanent magnets 26. The holder jig 36 has an axially extending through hole 46 defined therein for receiving the rotor 16 therein, with the insertion grooves 34 being held in communication with the through hole 46. Two fitting slots 34a, 34b each having a substantially arcuate cross-sectional shape are defined in respective corners of an inner wall surface 34d (see FIG. 3) of each of the insertion grooves 34. Each of the insertion grooves 34 has a radially outwardly tapered surface 34c (see FIGS. 2~4) near an upper end thereof from which the rotor 16 will be inserted into the through hole 46. Two of the resilient members 37 are disposed in the respective fitting slots 34a, 34b in each of the insertion grooves 34. Each of the resilient members 37 comprises a rubber rod having a circular cross-sectional shape.

The holder jig 36 has a plurality of second teeth 48 projecting downwardly from a lower end thereof and disposed at circumferentially spaced intervals. The second teeth 48 fit respectively into the recesses 44 of the movable jig 32, and have their respective outer edges circumscribed by a circle whose diameter is selected to spread the cylindrical sleeve 28 radially outwardly to a diameter greater than the diameter of a circle corresponding to the inner wall surfaces 34d of the insertion grooves 34. The first teeth 42 and the second teeth 48 jointly serve to spread the cylindrical sleeve 28 radially outwardly as described above. The second teeth 48 have smaller-diameter tapered surfaces 48a on their outer tip ends.

A fixing device 50 is mounted on an outer circumferential edge of the upper end of the holder jig 36. The fixing device 50 comprises a plurality of circumferentially spaced pins 52 secured to the holder jig 36 and a plurality of semicircular retainers 54 rotatably mounted on the respective pins 52.

Figure 5:
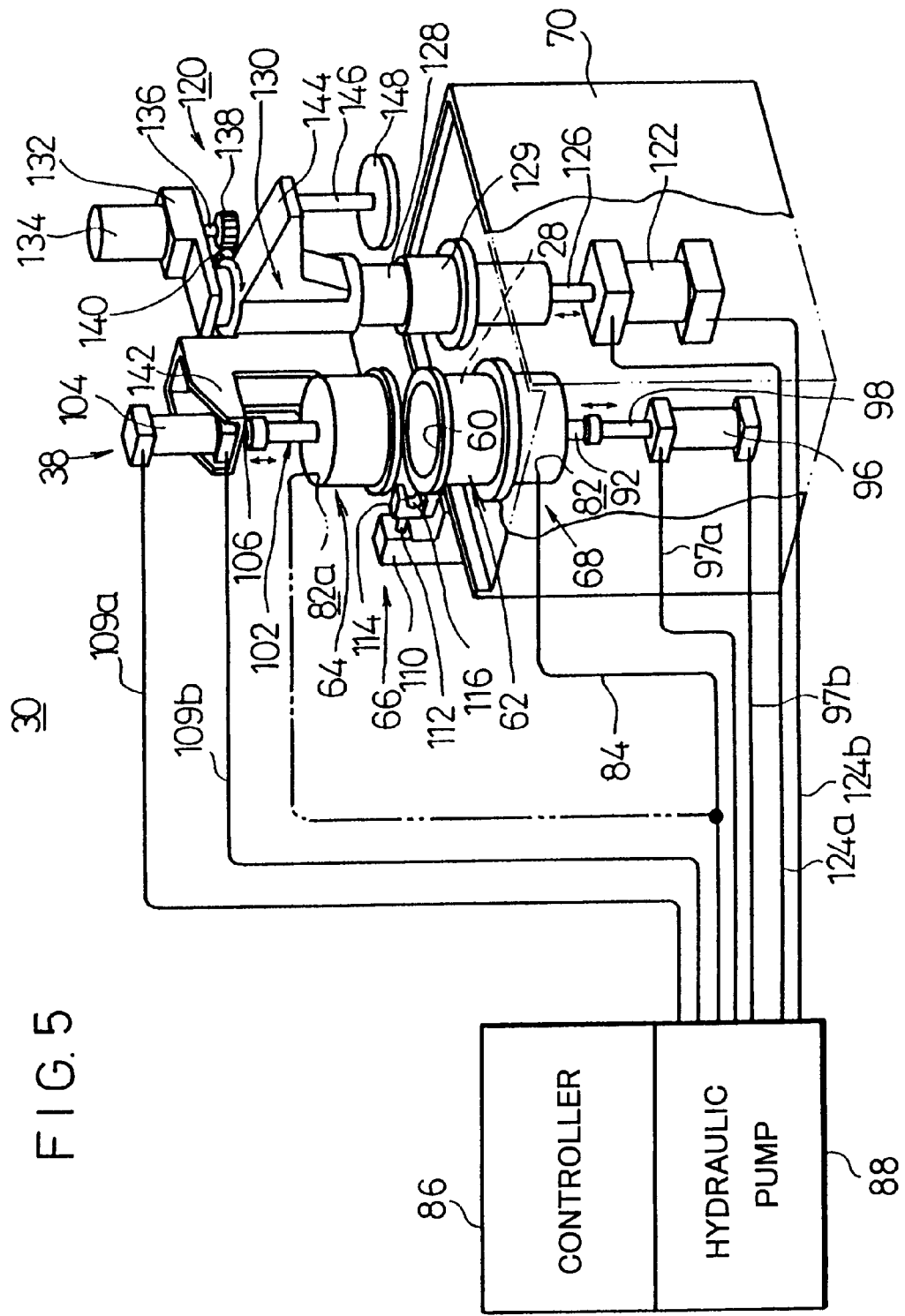
FIG. 5 is a perspective view of the covering apparatus according to the first embodiment.
Figure 6:
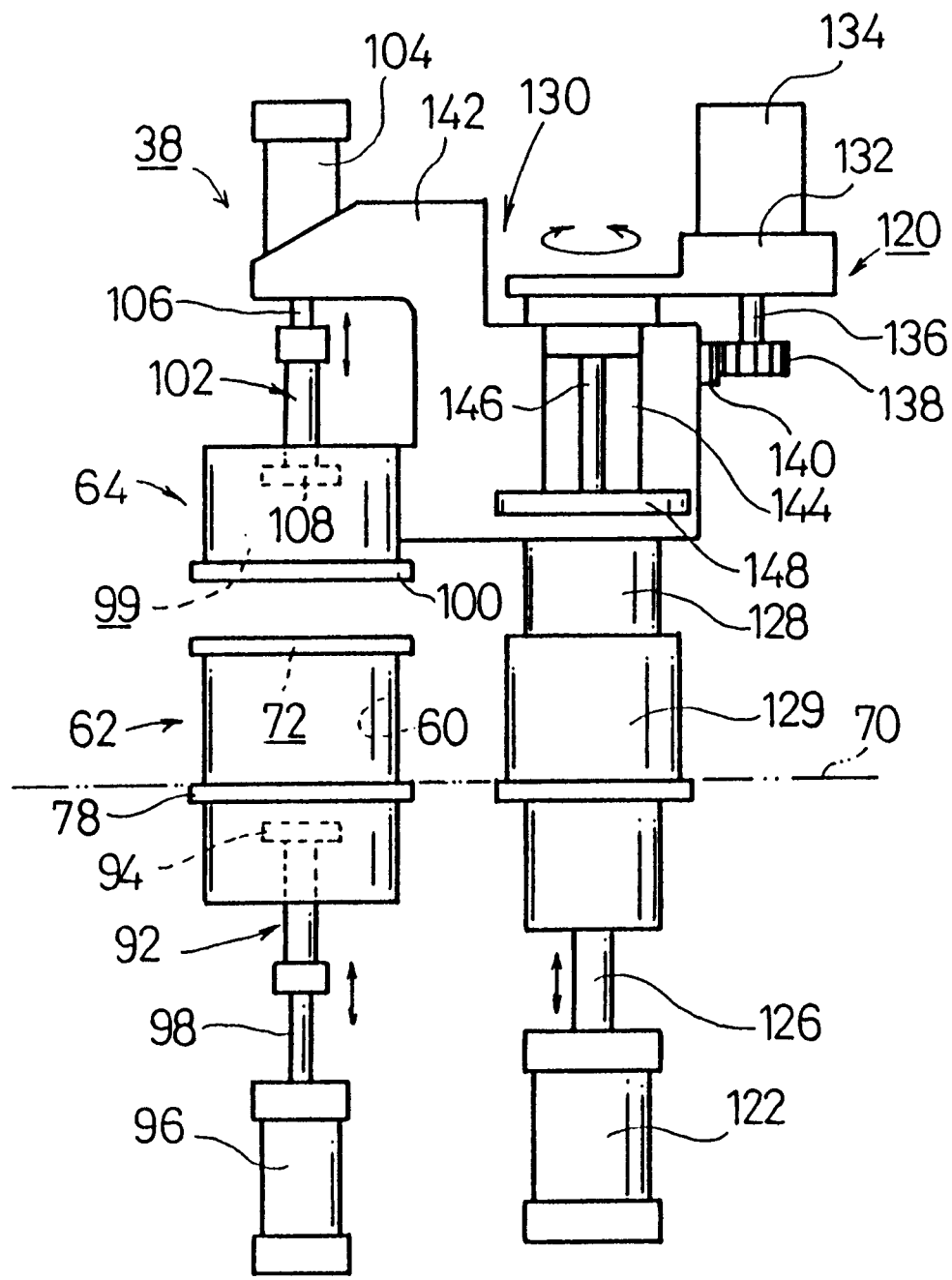
FIG. 6 is a front elevational view of the covering apparatus according to the first embodiment.
Figure 7:
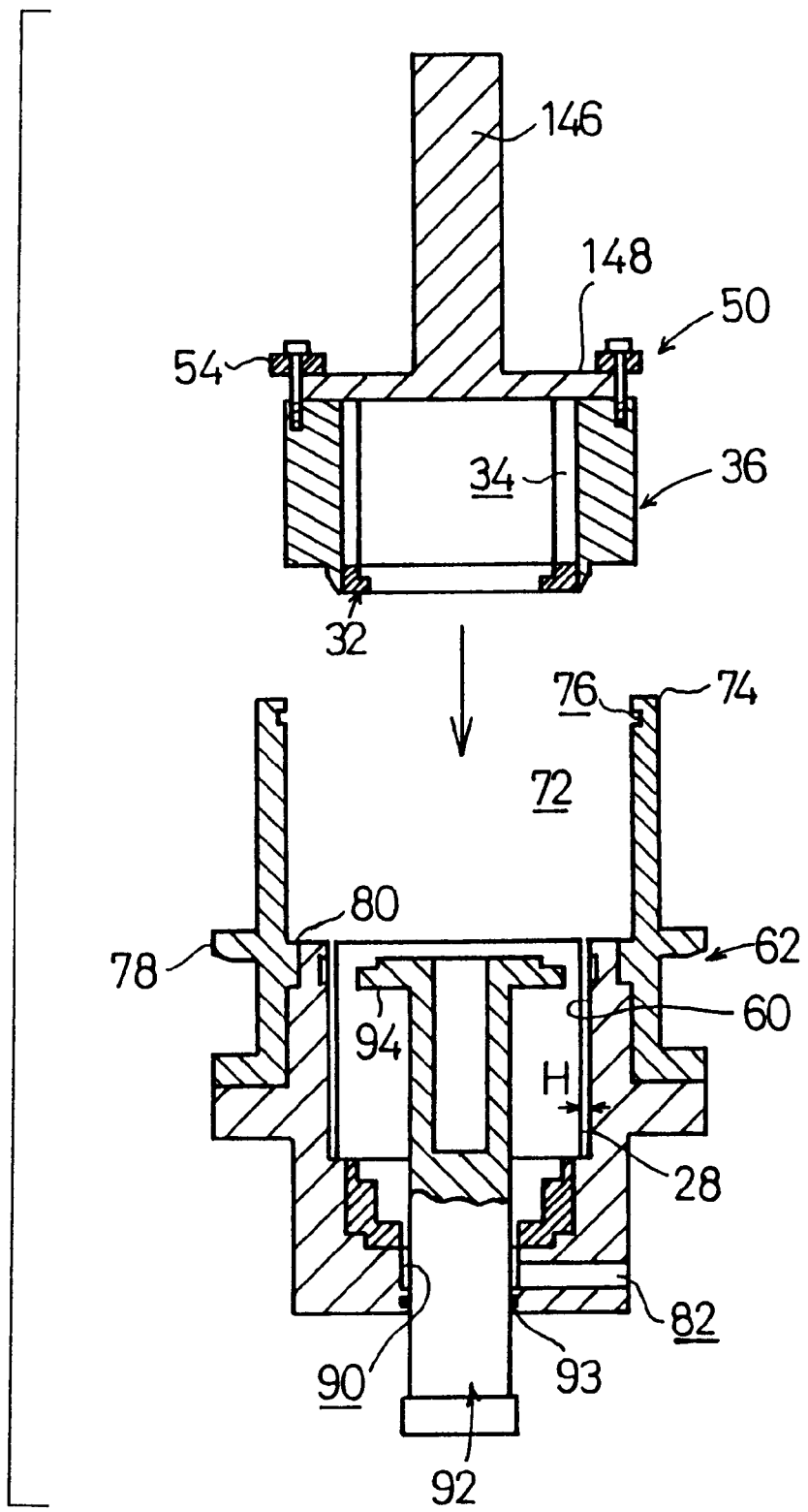
FIG. 7 is a vertical cross-sectional view showing the manner in which a cylindrical member is disposed in a first casing member in the covering apparatus according to the first embodiment.

As shown in FIGS. 5 through 7, the covering apparatus 30 includes a first casing member 62 for inserting the cylindrical sleeve 28 therein, the first casing sleeve 62 having an inner circumferential surface 60 which will be spaced by a gap H from the outer circumferential surface of the cylindrical sleeve 28 placed in the first casing member 62. A casing member 64 is movable with respect to the first casing member 62. A clamping device 66 is provided for hermetically coupling the first casing member 62 and the second casing member 64 with the cylindrical sleeve 28 and the rotor 16 housed therein. Furthermore, a fluid supply device 68 is provided for pressing the cylindrical sleeve 28 against the inner circumferential surface 60 under a hydraulic pressure (fluid pressure) to spread the cylindrical sleeve 28 radially outwardly.

The first casing member 62 is mounted on a base 70 and comprises a substantially cylindrical bottomed body having an upward opening 72 defined by an upward cylindrical wall 74 (see FIG. 7). The cylindrical wall 74 has a clearance groove 76 defined fully circumferentially in an inner circumferential surface near an upper edge thereof. An outwardly projecting annular flange 78 and an inwardly projecting annular ledge 80 are defined on a lower end thereof.

The fluid supply device 68 comprises a fluid passage 82 defined horizontally in a lower end portion of the first casing member 62. A pipe 84 (see FIG. 5) has an end connected to the fluid passage 82 and an opposite end connected to a hydraulic pump 88 which can be controlled by a controller 86. The fluid passage 82 communicates with the interior space of the first casing member 62 through a hole 90 defined centrally in the lower end portion of the first casing member 62. The presser device 38 includes a lower setting member 92 slidably inserted in the hole 90 and hermetically sealed by an O-ring 93 (see FIG. 7) held on a cylindrical wall which defines the hole 90.

The lower setting member 92 comprises a substantially cylindrical body with a large-diameter flange 94 on its upper end. The lower setting member 92 has a lower end projecting from the lower end of the first casing member 62 and connected to the upper end of a rod 98 (see FIGS. 5 and 6) which extends upwardly from a lifting cylinder 96. The lifting cylinder 96 is coupled to the hydraulic pump 88 through pipes 97a, 97b.

Figure 10:
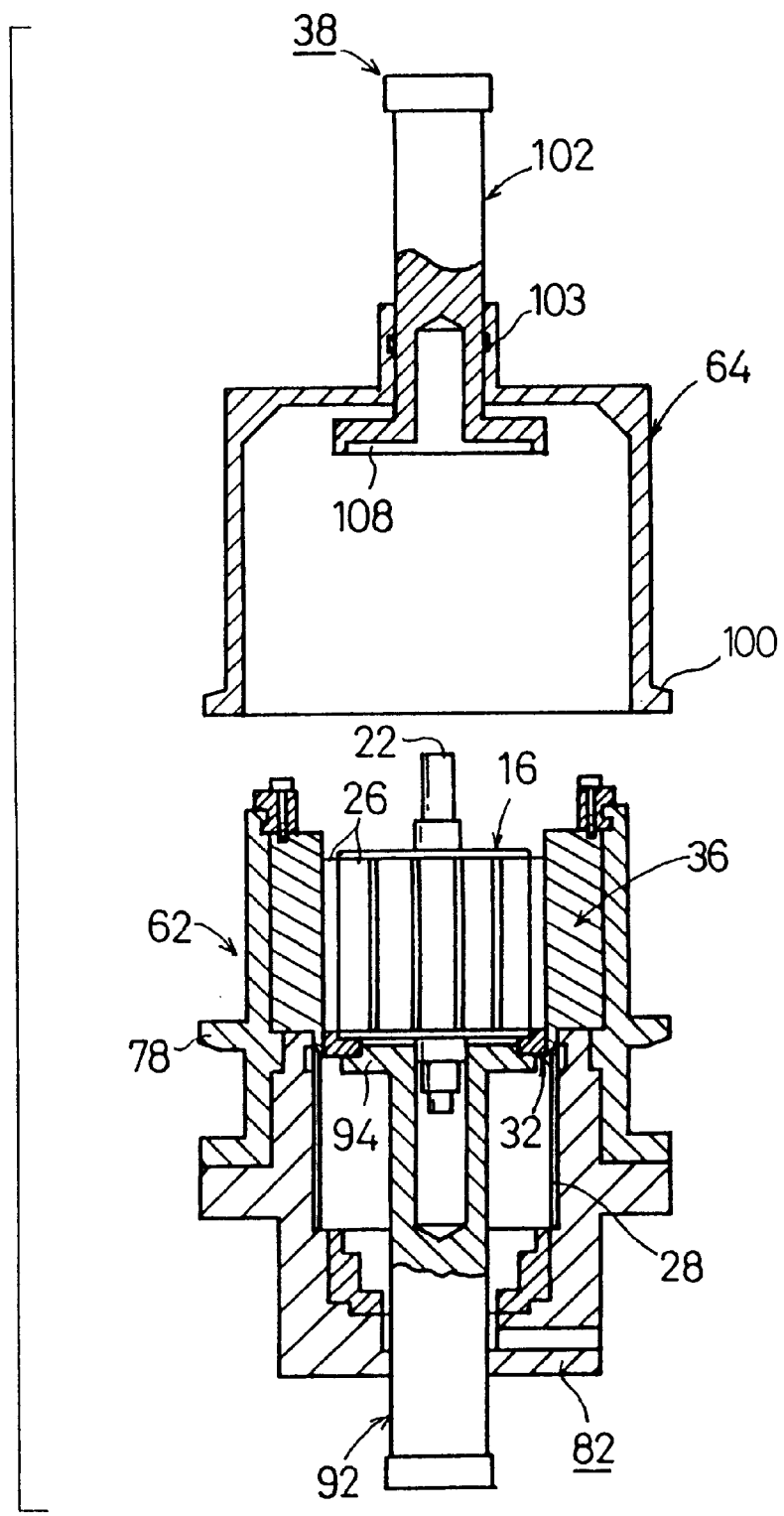
FIG. 10 is a vertical cross-sectional view showing the manner in which the rotor and the permanent magnets are disposed on the first casing member in the covering apparatus according to the first embodiment.

The second casing member 64 is supported by a turning unit (described later on), and comprises a substantially cylindrical bottomed body having a downward opening 99 and an outwardly projecting annular engaging flange 100 on a lower end thereof. The presser device 38 also comprises an upper setting member 102 slidably inserted in the upper end of the second casing member 64 and hermetically sealed by an O-ring 103 (see FIG. 10) held on an upwardly projecting cylindrical wall of the second casing member 64. The upper setting member 102 has an upper end coupled to the lower end of a rod 106 which extends downwardly from a pressing cylinder 104 mounted on the turning unit.

The upper setting member 102 has a large-diameter flange 108 (see FIGS. 6 and 10) on a lower end thereof which is held in engagement with an upper end wall of the second casing member 64 for thereby holding the second casing member 64. The pressing cylinder 104 is coupled to the hydraulic pump 88 through pipes 109a, 109b (see FIG. 5).

The clamping device 66 comprises a plurality of cylinders 110 fixedly mounted on the base 70 and having respective rods 112 projecting toward the center of the first casing member 62, with clamps 114 coupled to the respective rods 112. The clamps 114 have respective grippers 116 on their distal ends for gripping the flange 78 of the first casing member 62 and the flange 100 of the second casing member 64 to hermetically holding the first and second casing members 62, 64 together.

A delivery device 120 (see FIGS. 5 and 6) has a lifting/lowering cylinder 122 coupled to the hydraulic pump 88 through pipes 124a, 124b (see FIG. 5). The lifting/lowering cylinder 122 has an upwardly extending rod 126 joined to a guide rod 128 which is vertically movably guided by a guide cylinder 129 mounted on the base 70. A turning unit 130 is angularly movably mounted on the guide rod 128 which has an upper end to which a turning motor 134 is affixed by an attachment 132. The turning motor 134 has a downwardly extending rotatable shaft 136 to which there is secured a first gear 138 held in mesh with a large-diameter second gear 140 of the turning unit 130.

The turning unit 130 has a first attachment arm 142 and a second attachment arm 144 which are angularly spaced from each other by a predetermined angle. The pressing cylinder 104 of the presser device 38, which is oriented downwardly, is fixedly mounted on the first attachment arm 142. A downwardly extending jig delivery support rod 146 is mounted on the second attachment arm 144 and has a large-diameter disk 148 on its lower end. The holder jig 36 and the movable jig 32 are detachably held by the support rod 146.

Operation of the covering apparatus 30 will be described below with respect to a covering method according to the first embodiment of the present invention.

As shown in FIG. 7, with the lower setting member 92 being elevated, the cylindrical sleeve 28 is placed in the first casing member 62 and radially spaced the gap H from the inner circumferential surface 60 of the first casing member 62. Thereafter, the holder jig 36 and the movable jig 32 are delivered together by the delivery device 120. At this time, the holder jig 36 is supported on the large-diameter disk 148 of the support rod 146 by the retainers 54, and the second teeth 48 of the holder jig 36 fit respectively in the recesses 44 of the movable jig 32, which is held by the holder jig 36 under frictional forces.

Figure 8:
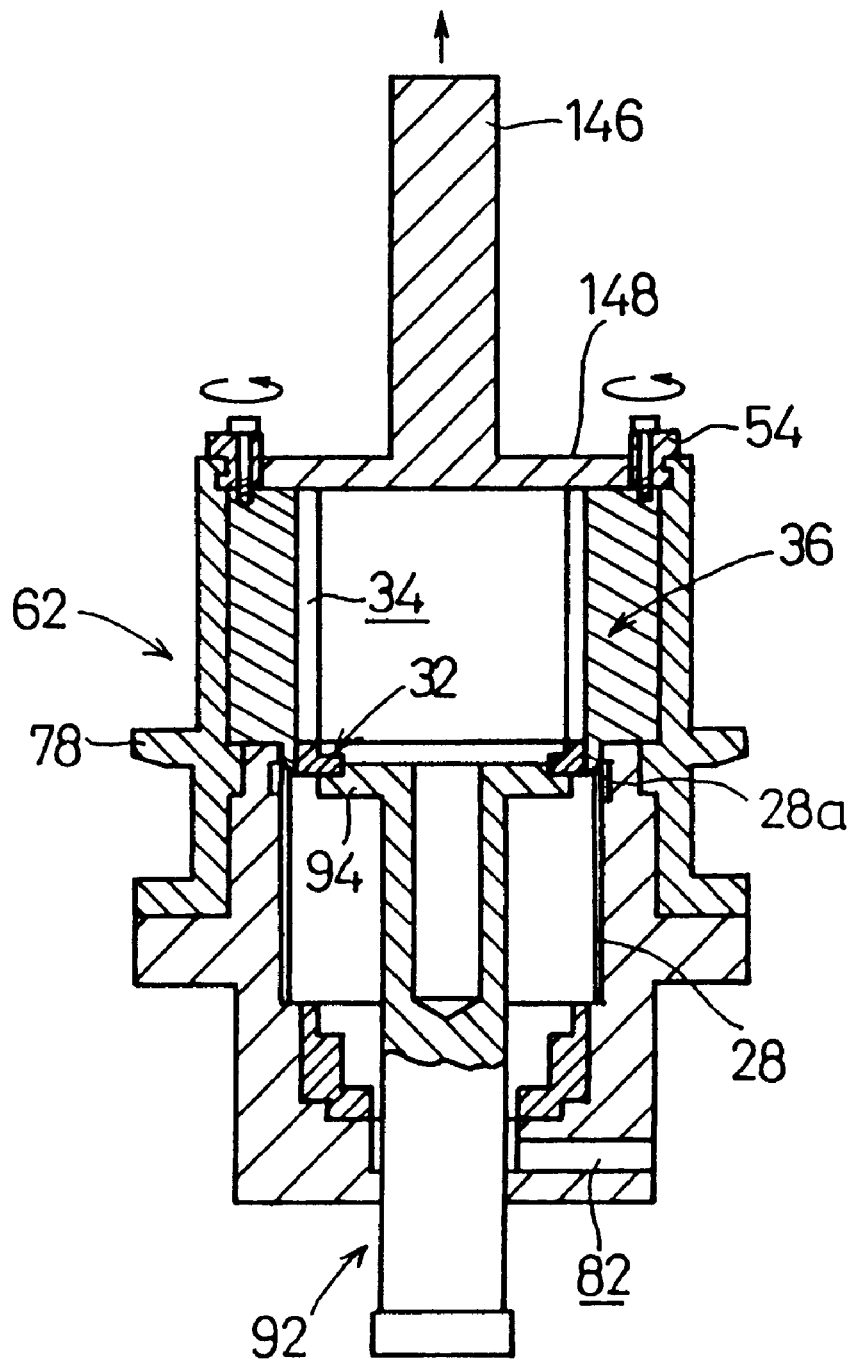
FIG. 8 is a vertical cross-sectional view showing the manner in which the holder jig and a movable jig are disposed in the first casing member in the covering apparatus according to the first embodiment.

The turning motor 134 is energized to cause the first and second gears 138, 140 to turn the turning unit 130 a predetermined angle until the support rod 146 is aligned with the first casing member 62. Then, the lifting/lowering cylinder 122 is actuated to lower the guide rod 128 in unison with the rod 126. The first and second teeth 42, 48 of the movable and holder jigs 32, 36 which are held by the support rod 146 are inserted into the end 28a of the cylindrical sleeve 28 while spreading it radially outwardly, as shown in FIG. 8.

The retainers 54 are then angularly moved about the respective pins 52 into engagement with the upper end of the cylindrical wall 74 of the first casing member 62 by inserting their portions into the clearance groove 76 and out of engagement with the large-diameter disk 148 of the support rod 146. The holder jig 36 is now held in the first casing member 62, and the movable jig 32 is placed on the large-diameter flange 94 of the lower setting member 92. The lifting/lowering cylinder 122 is actuated to lift the support rod 146 only.

Figure 9:
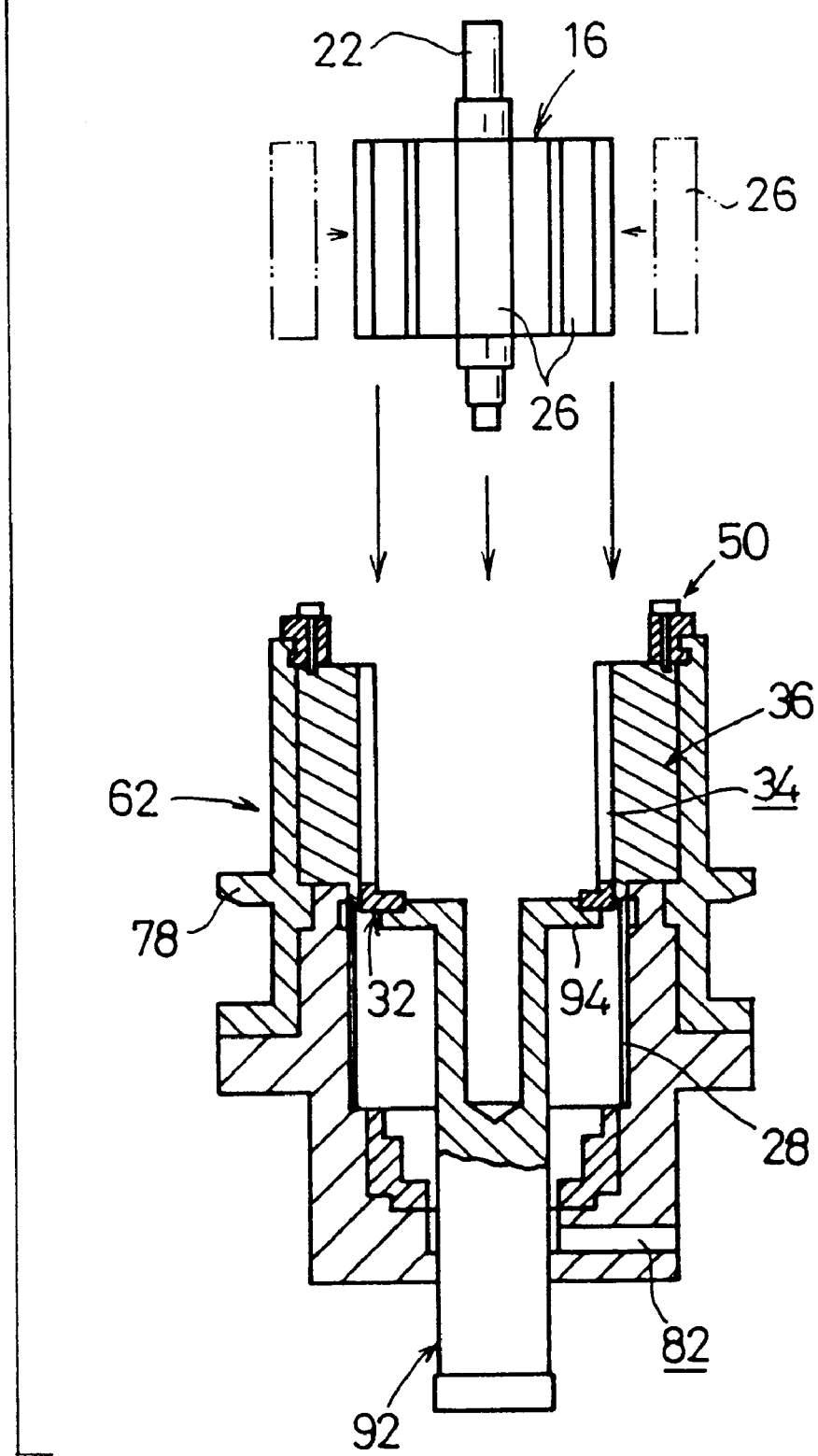
FIG. 9 is a vertical cross-sectional view showing the manner in which the rotor and the permanent magnets are about to be disposed on the first casing member in the covering apparatus according to the first embodiment.

As shown in FIG. 9, the rotor 16 and the permanent magnets 26 which are positioned respectively in the grooves 24a are inserted into the through hole 46 and the insertion grooves 34, respectively, in the holder jig 36. The end face 16a of the rotor 16 is positioned and supported on the engaging surface 40 of the movable jig 32, and the permanent magnets 26 are aligned with the respective first teeth 42 of the movable jig 32 (see FIG. 10).

Figure 3:
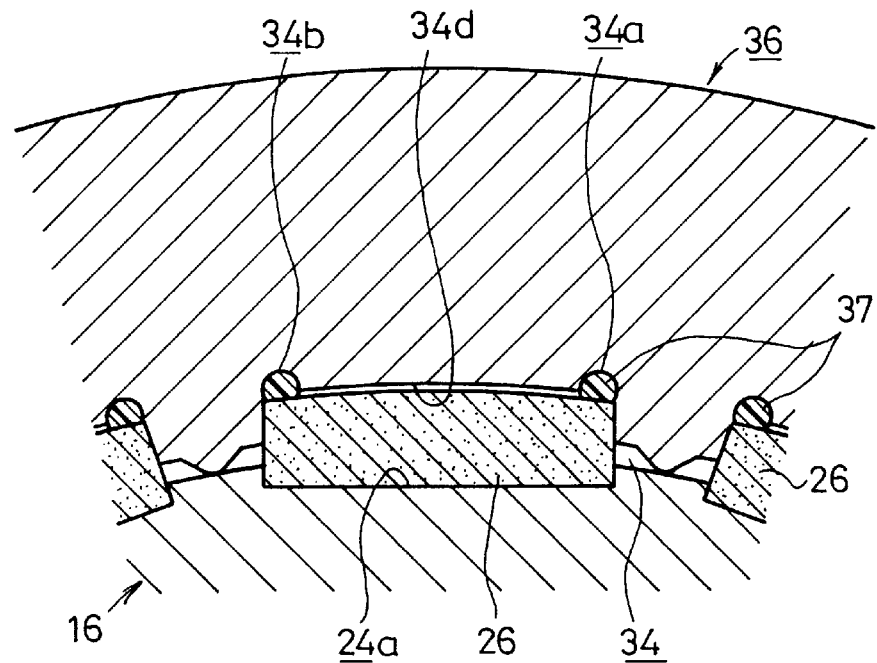
FIG. 3 is an enlarged fragmentary cross-sectional view of a rotor and permanent magnets inserted in a holder jig of the covering apparatus according to the first embodiment.
Figure 4:
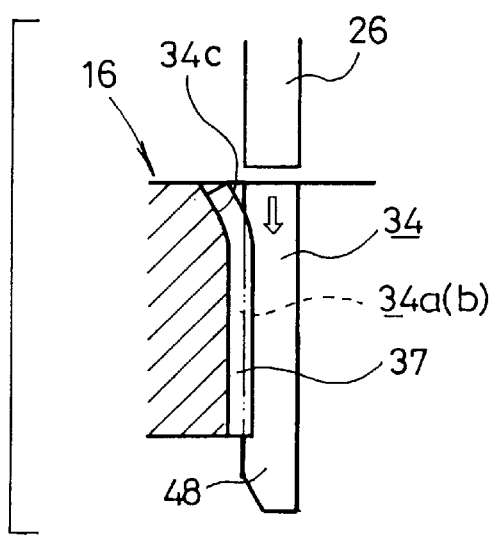
FIG. 4 is a fragmentary vertical cross-sectional view of the rotor and the permanent magnets inserted in the holder jig.

As described above, the resilient members 37 are positioned in the insertion grooves 34 of the holder jig 36. Therefore, when the permanent magnets 26 and the rotor 16 are inserted together into the holder jig 36, the permanent magnets 26 are held out of contact with the inner wall surfaces 34d of the insertion grooves 34, as shown in FIG. 3. The permanent magnets 26 are thus prevented from being damaged by contact with the inner wall surfaces 34d.

The resilient members 37 are disposed in the respective fitting slots 34a, 34b defined respectively in the corners of each of the insertion grooves 34. The resilient members 37 are effective in reducing the resistance to which the permanent magnets 26 are subjected when they are inserted into the insertion grooves 34. Since each of the resilient members 37 comprises a rubber rod of circular cross section, the resilient members 37 can press the permanent magnets 26 firmly against the outer circumferential surface of the rotor 16.

Each of the insertion grooves 34 has the radially outwardly tapered surface 34c near the upper end thereof from which the rotor 16 will be inserted into the through hole 46. Therefore, the resilient members 37 do not interfere with the ends of the permanent magnets 26, which can easily and smoothly be inserted into the insertion grooves 34.

Unlike the conventional arrangement, the permanent magnets 26 do not need to be secured to the rotor 16 in advance. Therefore, no adhesive is necessary to bond the permanent magnets 26 to the rotor 16, and hence the cost of the motor rotor may be reduced. Since the permanent magnets 26 can easily and firmly be held in position, the covering process can efficiently be performed to produce high-quality motor rotors.

Thereafter, the second casing member 64 is brought to a position above the first casing member 62 by the turning motor 134 (see FIG. 10), and then lowered into engagement with the first casing member 62 by the lifting/lowering cylinder 122. The flange 78 of the first casing member 62 and the flange 100 of the second casing member 64 abut against each other, and are gripped together by the grippers 116 of the clamps 114 which are actuated by the cylinders 110 of the clamping device 66. The first casing member 62 and the second casing member 64 are now hermetically joined to each other (see FIG. 11).

Figure 11:
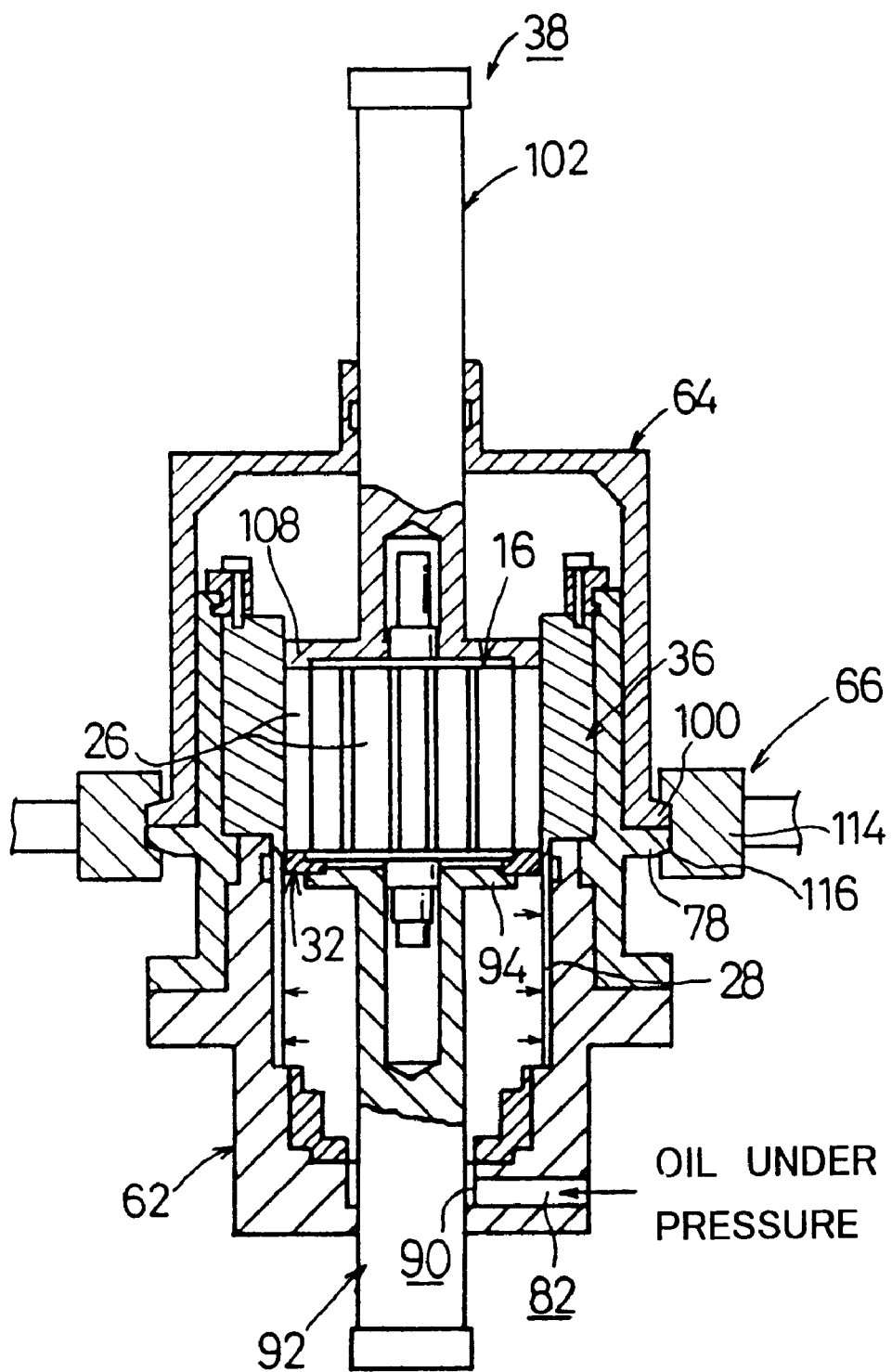
FIG. 11 is a vertical cross-sectional view showing the manner in which a second casing member is coupled to the first casing member and oil is supplied under pressure into the first and second casing members in the covering apparatus according to the first embodiment.

Then, as shown in FIG. 11, when oil under pressure is supplied from the hydraulic pump 88 (FIG. 5) through the pipe 84 to the fluid passage 82 of the fluid supply device 68, the supplied oil under pressure is introduced through the hole 90 into the first casing member 62. The cylindrical sleeve 28 disposed in the first casing member 62 is now pressed under the oil pressure against the inner circumferential surface 60 of the first casing member 62, and spread radially outwardly across the gap H.

With the cylindrical sleeve 28 being thus spread radially outwardly, the pressing cylinder 104 is actuated and the lifting cylinder 96 is either actuated to move its rod 98 downwardly or deactivated. The upper setting member 102 coupled to the rod 106 is lowered, causing the large-diameter flange 108 thereof to press the rotor 16 and the permanent magnets 26 downwardly in unison. Since the rotor 16 and the permanent magnets 26 are placed on the movable jig 32, the rotor 16 and the permanent magnets 26 descend in unison with the movable jig 32 into the cylindrical sleeve 28 which has been spread radially outwardly under the oil pressure. At this time, excessive oil in the first casing member 62 is forced into the second casing member 64 through the clearance between the rotor 16 and the holder jig 36.

The permanent magnets 26, which are being pressed into the grooves 24a of the rotor 16 by the resilient members 37, are inserted into the cylindrical sleeve 28. Therefore, the permanent magnets 26 are not skewed with respect to the grooves 24a, and hence can smoothly and reliably be inserted into the cylindrical sleeve 28.

Figure 12:
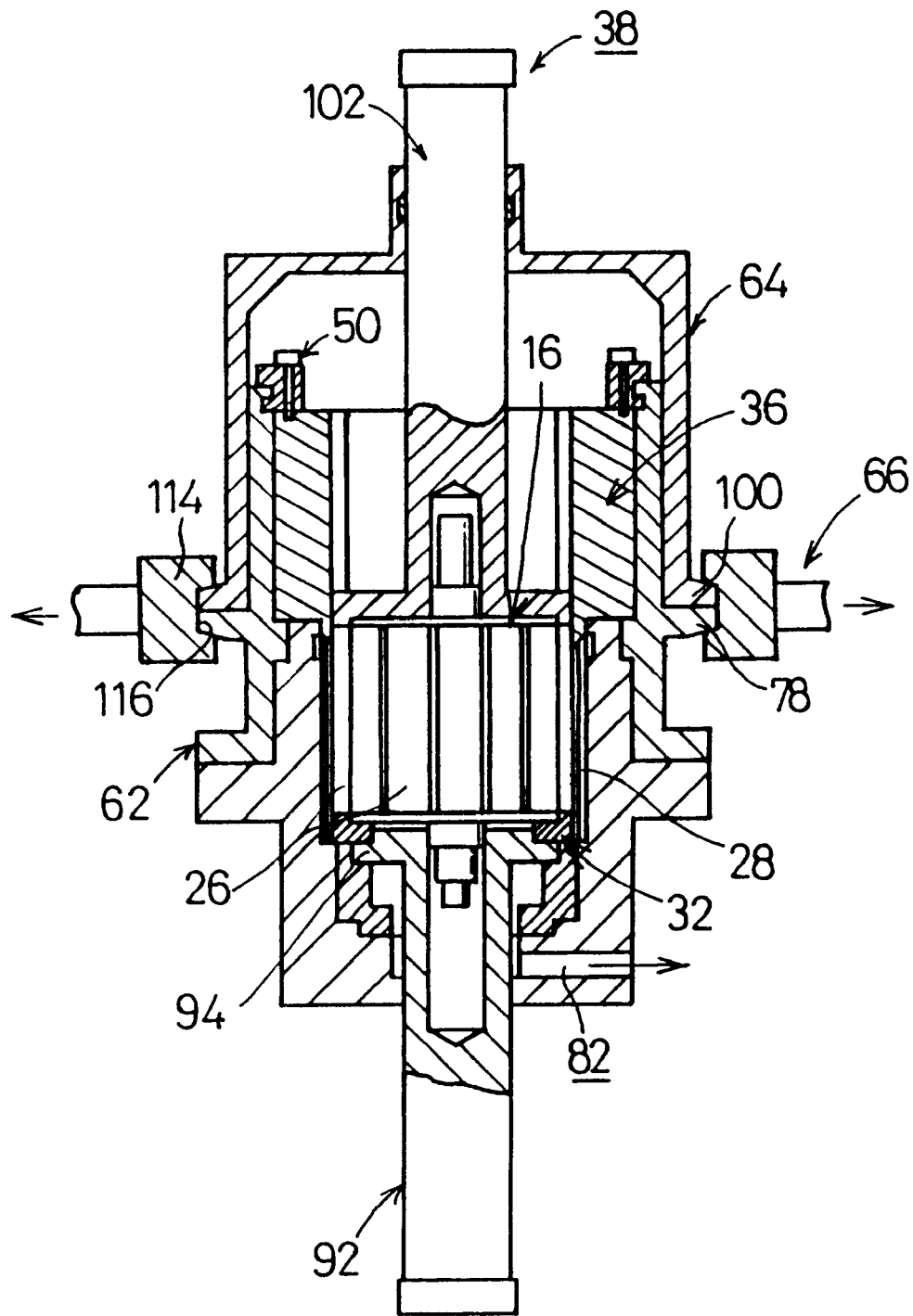
FIG. 12 is a vertical cross-sectional view showing the manner in which the rotor has been pressed into the cylindrical member in the covering apparatus according to the first embodiment.

As shown in FIG. 12, after the rotor 16 and the permanent magnets 26 are inserted into the cylindrical sleeve 28, the oil under pressure in the first casing member 62 is returned through the fluid passage 82 and the pipe 84 to the hydraulic pump 88. The pressure in the first casing member 62 is lowered to the atmospheric pressure, allowing the cylindrical sleeve 28 to shrink radially inwardly into covering relation to the permanent magnets 26. Then, the clamping device 66 is operated to displace the clamps 114 away from the first and second casing members 62, 64, and the second casing member 64 is lifted by the lifting/lowering cylinder 122.

Figure 13:
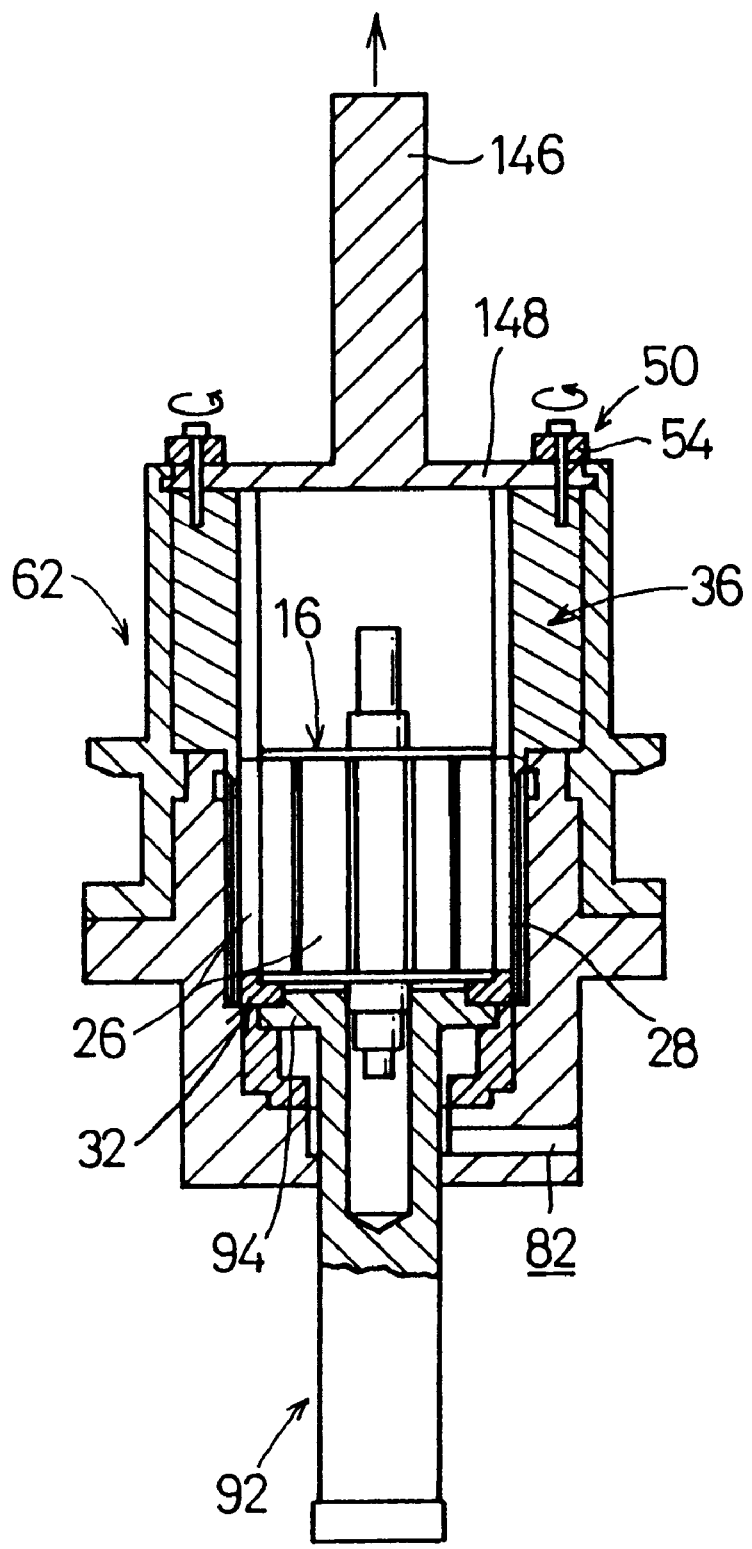
FIG. 13 is a vertical cross-sectional view showing the manner in which the holder jig is removed from the first casing member in the covering apparatus according to the first embodiment.
Figure 14:
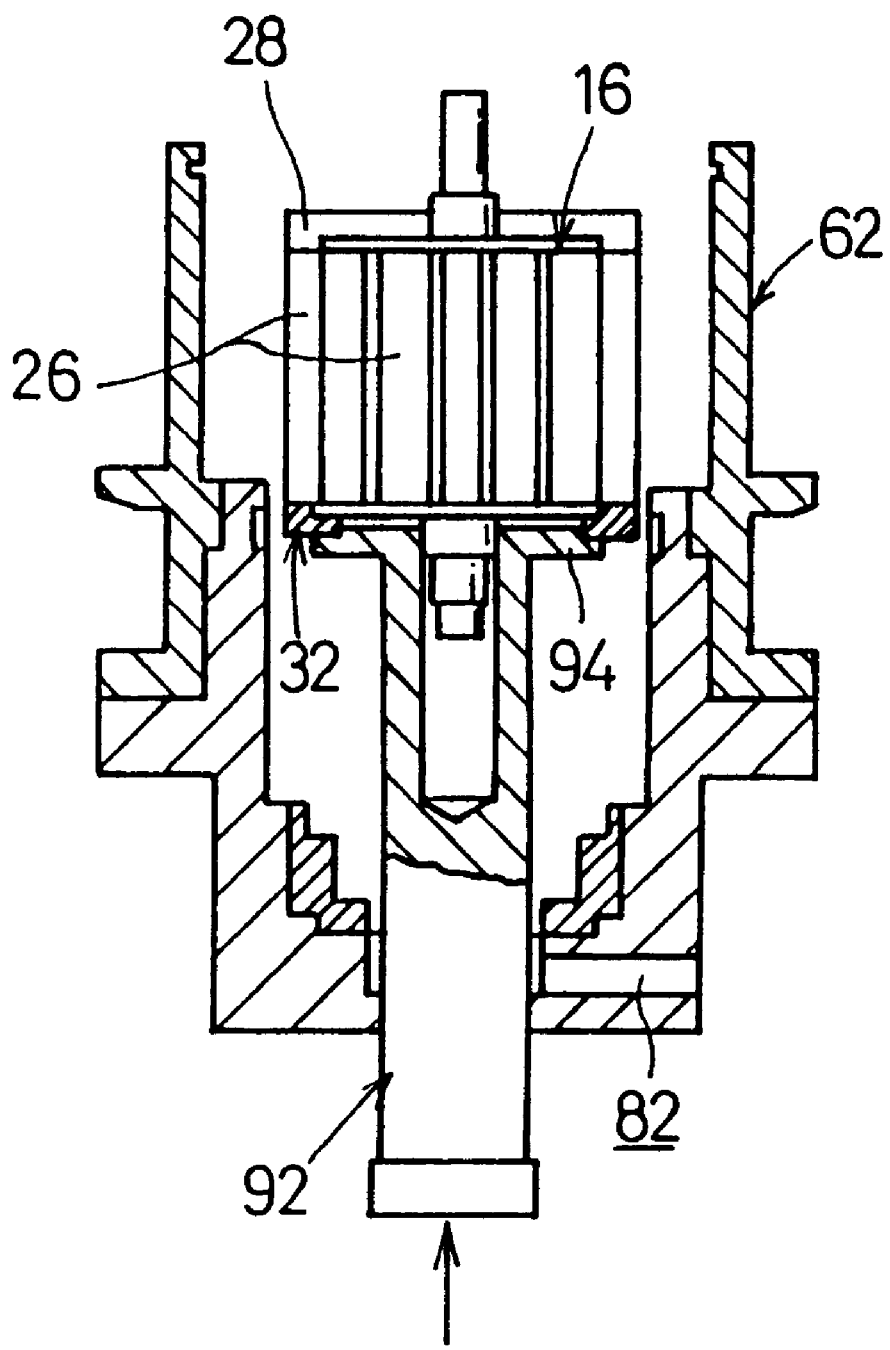
FIG. 14 is a vertical cross-sectional view showing the manner in which the rotor covered with the cylindrical member is taken out of the first casing member in the covering apparatus according to the first embodiment.

Thereafter, as shown in FIG. 13, the support rod 146 of the delivery device 120 is placed on the first casing member 62, and the retainers 54 are turned to hold the holder jig 36 on the support rod 146. The support rod 146 and the holder jig 36 are elevated together away from the first casing member 62, after which the lifting cylinder 96 is actuated to elevate the lower setting member 92 and the rotor 16 (see FIG. 14) out of the first casing member 62.

Figure 15:
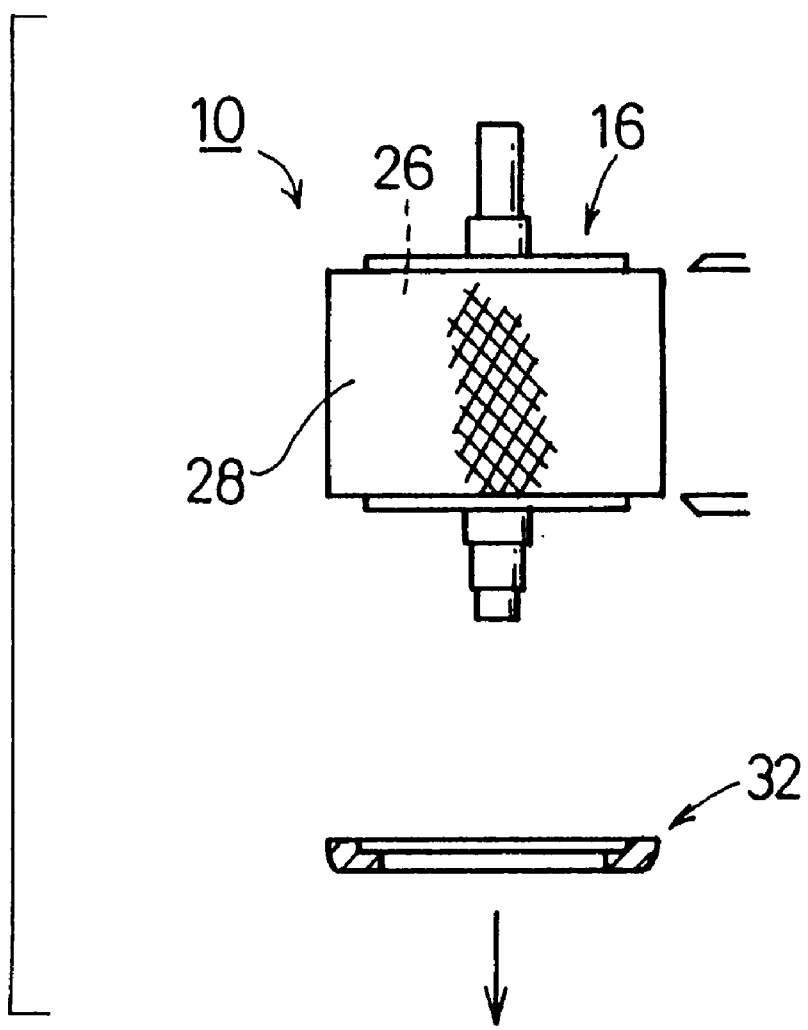
FIG. 15 is an elevational view showing the manner in which excessive portions of the cylindrical member are cut off from the covered rotor in the covering apparatus according to the first embodiment.

Then, as shown in FIG. 15, excess ends of the cylindrical sleeve 28 which extend axially outwardly beyond the opposite ends of the rotor 16 are cut off by cutters, and the movable jig 32 is removed from the rotor 16. The process of covering the permanent magnets 26 on the rotor 16 with the cylindrical member 28 is now completed.

In the above first embodiment, the fluid passage 82 of the fluid supply device 68 is defined in the first casing member 62. However, a fluid passage 82a may be defined in the second casing member 64 instead of or in addition to the fluid passage 82, and may be connected to the hydraulic pump 88 through a pipe indicated by the two-dot-and-dash lines in FIG. 5.

Figure 16:
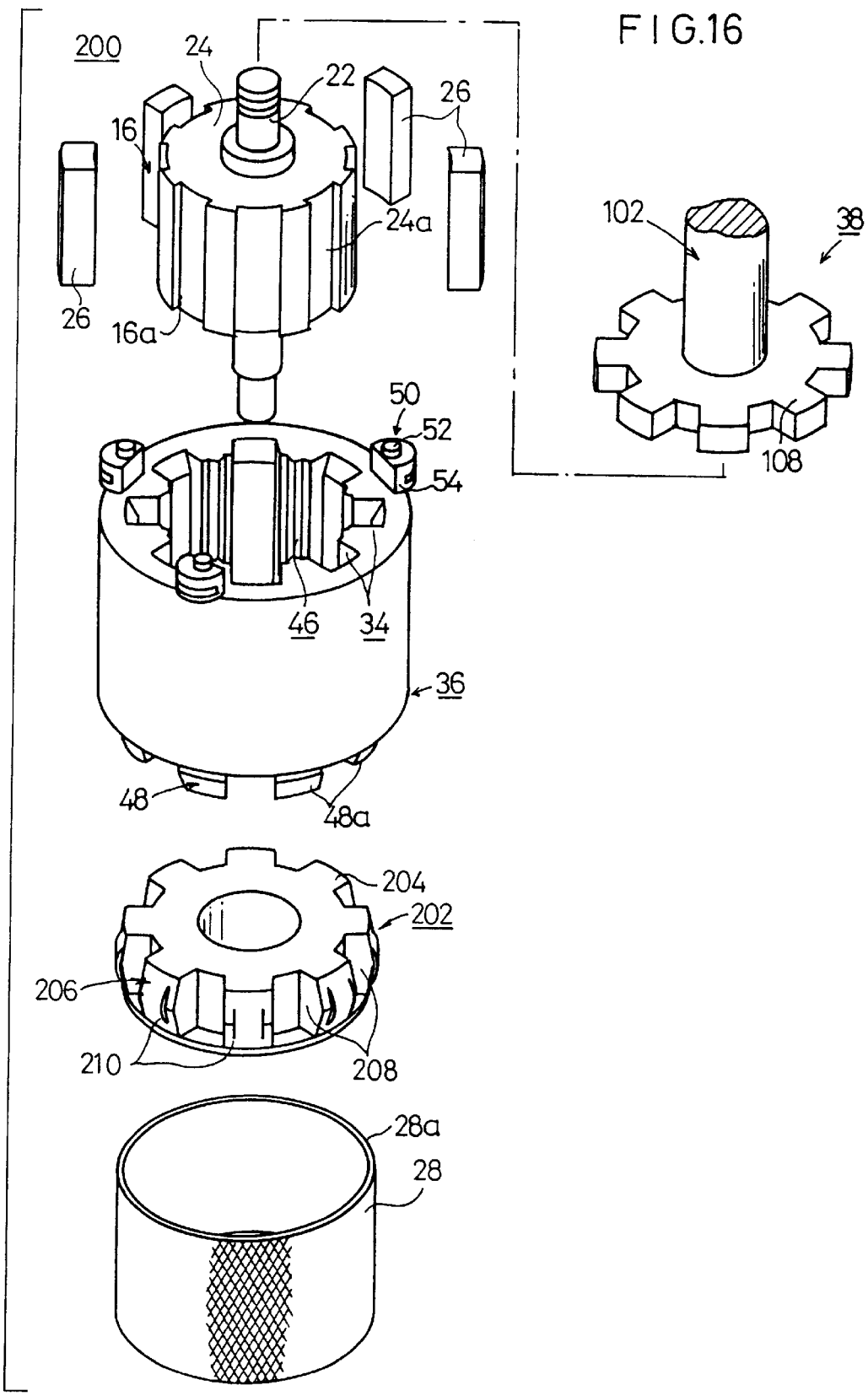
FIG. 16 is an exploded perspective view of a covering apparatus according to a second embodiment of the present invention.

FIG. 16 shows an exploded perspective view of a covering apparatus 200 according to a second embodiment of the present invention. Those parts of the covering apparatus 200 which are identical to those of the covering apparatus 30 according to the first embodiment are denoted by identical reference numerals and representations, and will not be described in detail below. The covering apparatus 200 is basically the same in overall structure as the covering apparatus 30 shown in FIG. 5. Operation of the covering apparatus 200 is also basically the same as operation of the covering apparatus 30, and will not be described in detail below.

As shown in FIG. 16, the covering apparatus 200 includes a movable jig 202 for positioning and supporting an end face 16. A of the rotor 16, a holder jig 36 has a plurality of insertion grooves 34 for inserting therein the permanent magnets 26 disposed in the grooves 24a of the rotor 16. The holder jig 36 and the movable jig 202 are pressable together into an insertion end 28a of the cylindrical member 28 for spreading the insertion end 28a radially outwardly to a diameter greater than the diameter of a circle corresponding to inner wall surfaces of the insertion grooves 34. Furthermore, a presser device 38 is provided for inserting the movable jig 202, together with the rotor 16 and the permanent magnets 26, into the cylindrical sleeve 28 under the guidance of the holder jig 36 while the rotor 16 and the permanent magnets 26 are engaging the movable jig 202.

The movable jig 202 is of a substantially disk shape and has an engaging surface 204 for placing the end face 16a of the rotor 16 thereon and a plurality of first teeth 206 projecting radially outwardly for positional alignment with the respective permanent magnets 26, with recesses 208 being defined between the first teeth 206. The first teeth 206 have respective radially outwardly projecting edges 210 circumscribed by a circle whose diameter is selected to spread the cylindrical sleeve 28 radially outwardly to a diameter greater than the diameter to which the cylindrical sleeve 28 is spread radially outwardly by the holder jig 36. The radially outwardly projecting edges 210 each have a width smaller than the width of the first teeth 206, and also each have an arcuate outer surface.

The second teeth 48 of the holder jig 36 fit respectively into the recesses 208 of the movable jig 202, and have their respective outer edges circumscribed by a circle whose diameter is selected to spread the cylindrical sleeve 28 radially outwardly to a diameter greater than the diameter of a circle corresponding to the inner wall surfaces of the insertion grooves 34. The first teeth 206 and the second teeth 48 jointly serve to spread the cylindrical sleeve 28 radially outwardly as described above. The second teeth 48 are positioned radially inwardly of the radially outwardly projecting edges 210 of the first teeth 206 (see FIGS. 17 and 18). As shown in FIG. 18, an O-ring 79 is disposed on the annular ledge 80 of the first casing member 62.

In the covering apparatus 200, the first teeth 206 of the movable jig 202 have the radially outwardly projecting edges 210 which project radially outwardly of the second teeth 48 of the holder jig 36. Therefore, as shown in FIG. 18, when the movable jig 202 is inserted together with the rotor 16 and the permanent magnets 26 into the cylindrical sleeve 28, the cylindrical sleeve 28 is further spread radially outwardly by the radially outwardly projecting edges 210 of the first teeth 206 of the movable jig 202.

Figure 17:
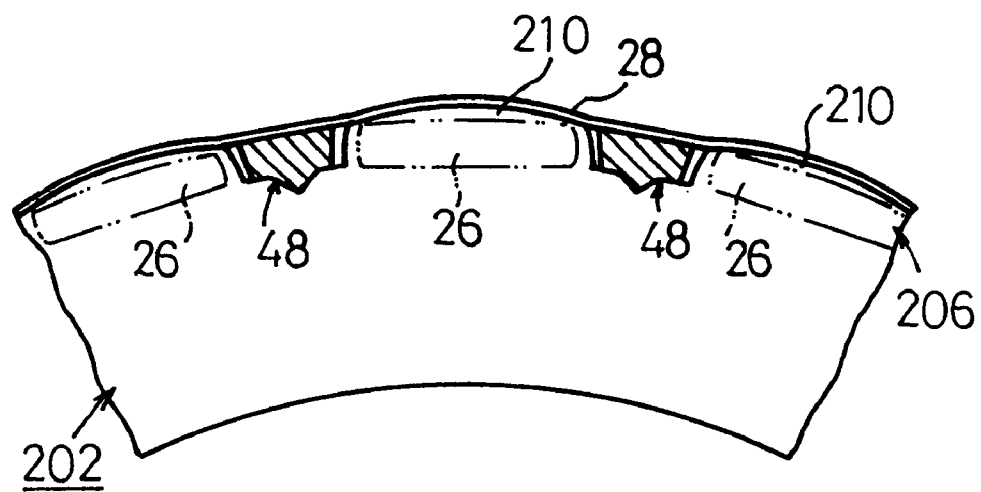
FIG. 17 is a plan view, partly in cross section, of a holder jig and a movable jig of the covering apparatus according to the second embodiment.
Figure 18:
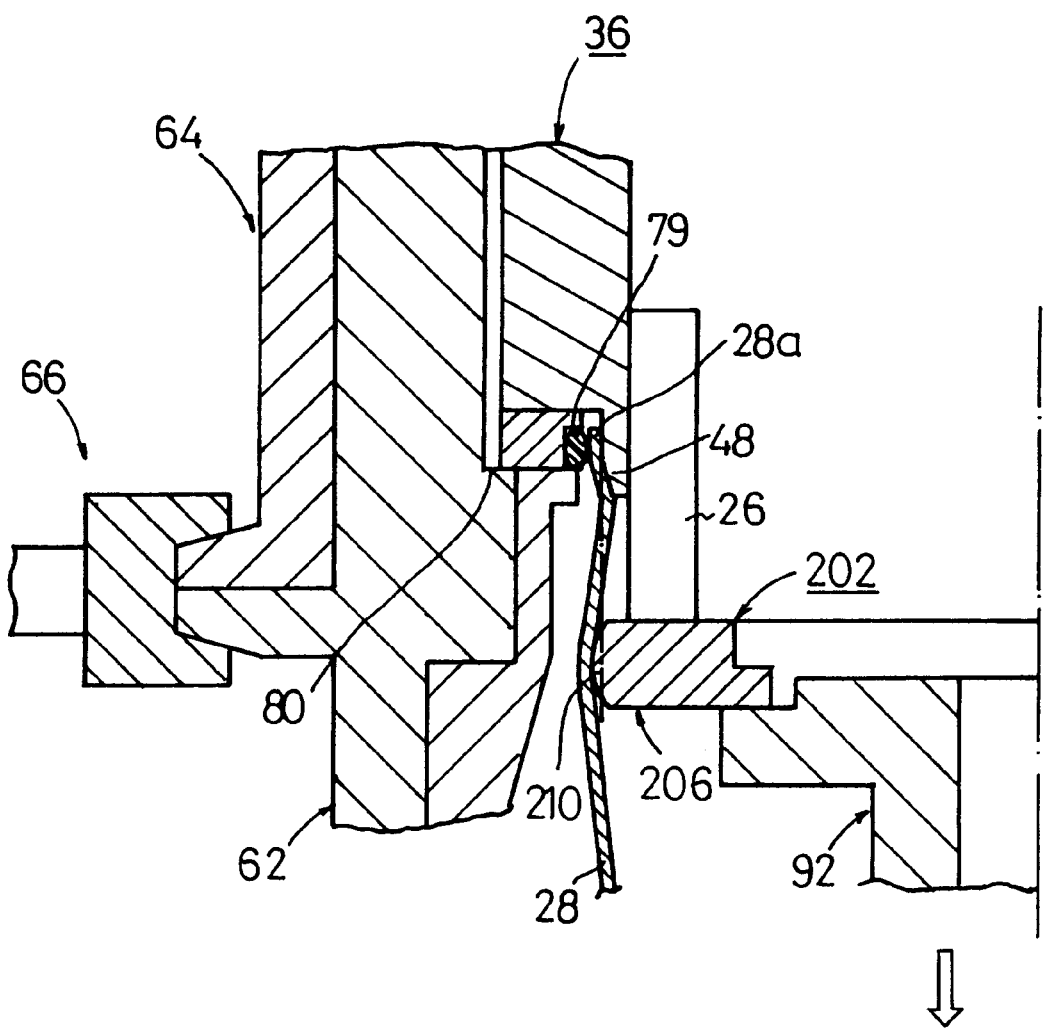
FIG. 18 is an enlarged fragmentary vertical cross-sectional view illustrative of how the holder jig and the movable jig operate.

Consequently, as illustrated in FIGS. 17 and 18, the cylindrical sleeve 28 which is reduced in diameter from the first teeth 206 toward the second teeth 48 of the holder jig 36 is not held in sliding contact with the permanent magnets 26. The permanent magnets 26 and the cylindrical sleeve 28 are thus prevented from being damaged, and the permanent magnets 26 can smoothly and efficiently be covered with the cylindrical sleeve 28.

Figure 19:
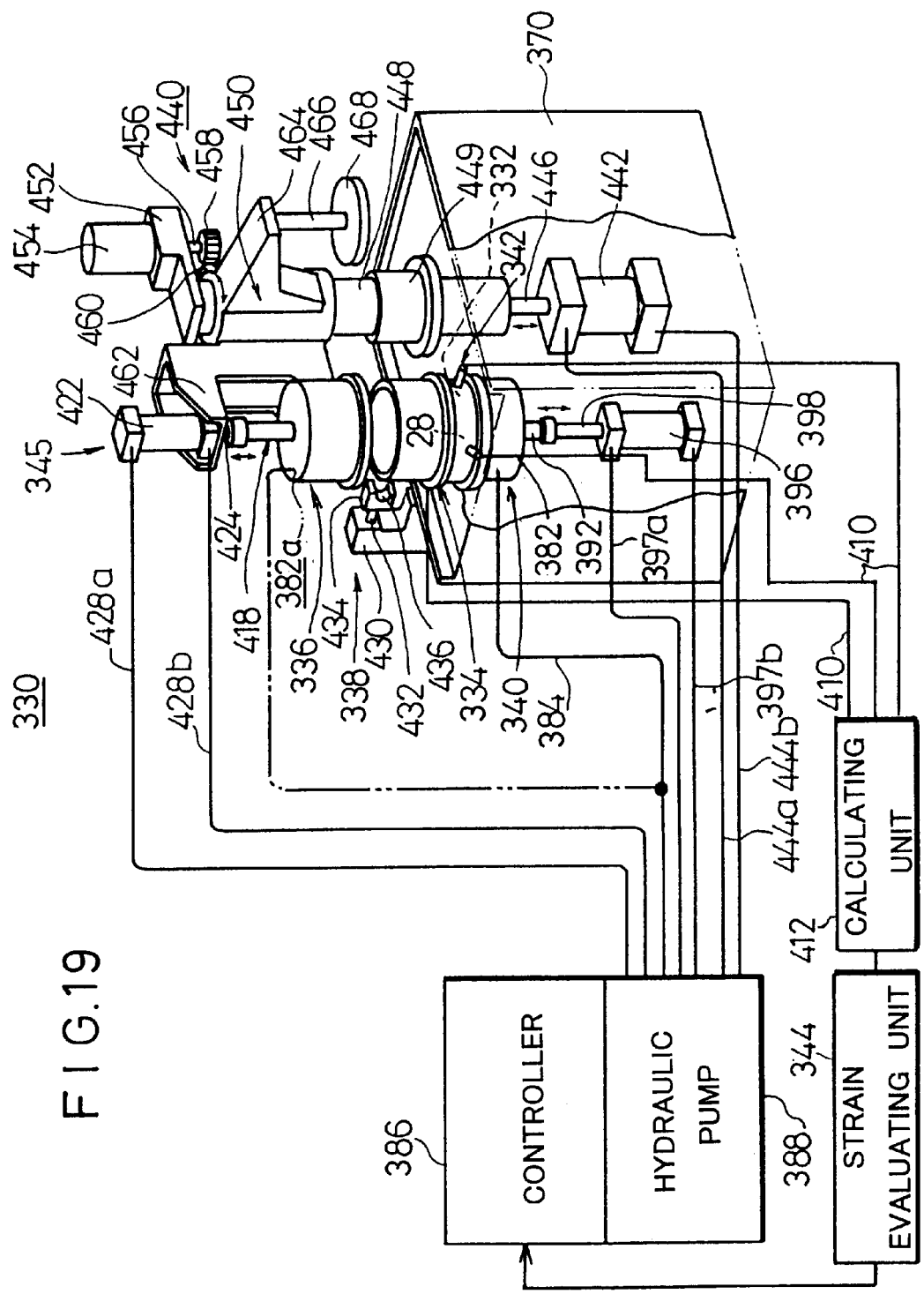
FIG. 19 is a perspective view of a covering apparatus according to a third embodiment of the present invention.
Figure 20:
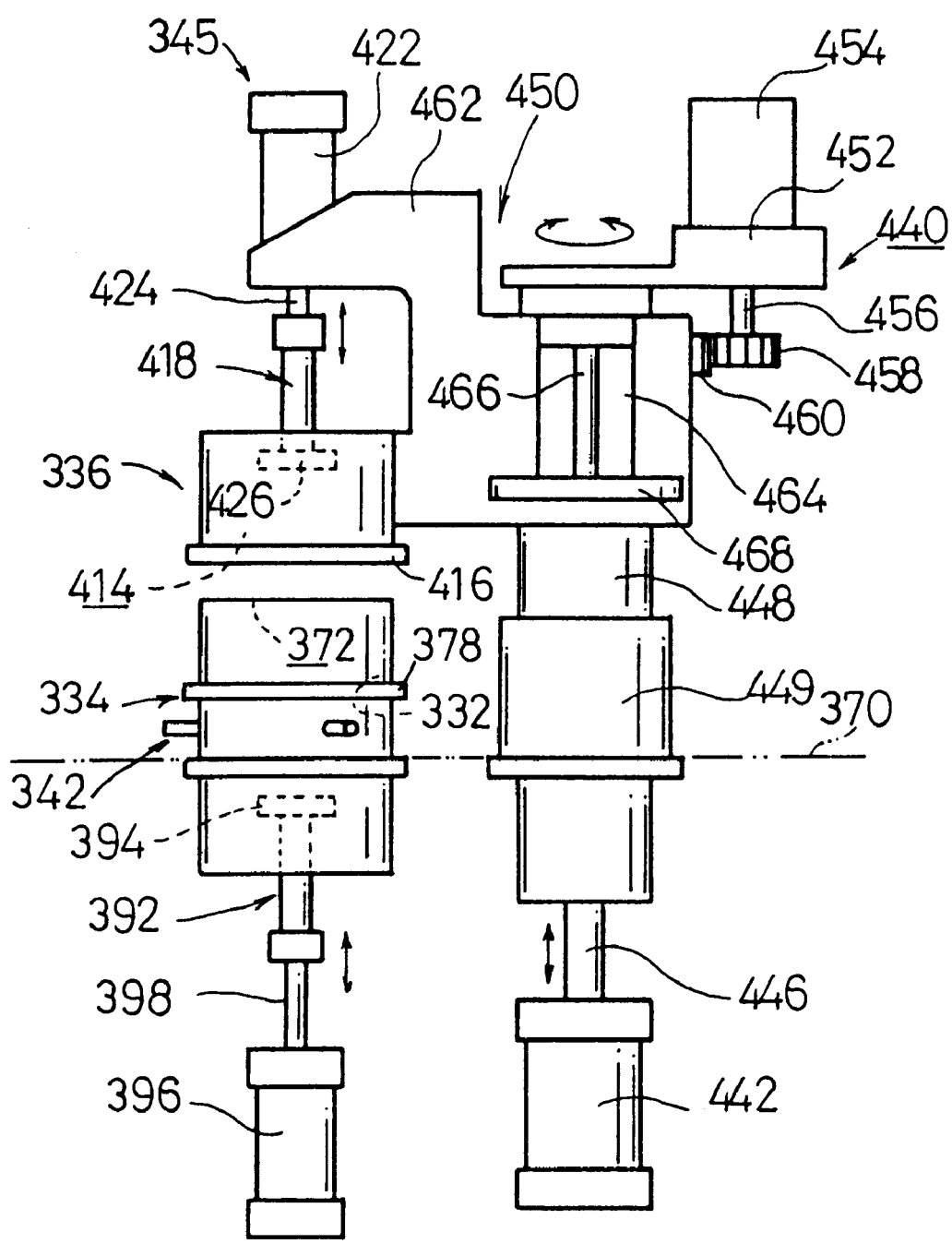
FIG. 20 is a front elevational view of the covering apparatus according to the third embodiment.

FIG. 19 shows in perspective a covering apparatus 330 according to a third embodiment of the present invention. As shown in FIGS. 19 and 20, the covering apparatus 330 includes a first casing member 334 for inserting the cylindrical sleeve 28 therein. The first casing member 334 has an inner circumferential surface 332 which will be spaced a given gap from the outer circumferential surface of the cylindrical sleeve 28 placed in the first casing member 334. A second casing member 336 is movable with respect to the first casing member 334. A clamping device 338 is provided for hermetically coupling the first casing member 334 and the second casing member 336 with the cylindrical sleeve 28 and the rotor 16 housed therein. A spreading device 340 is provided for pressing the cylindrical sleeve 28 against the inner circumferential surface 332 under a hydraulic pressure (fluid pressure) to spread the cylindrical sleeve 28 radially outwardly. A measuring device 342 is provided for measuring a diametrical displacement of the cylindrical sleeve 28 upon being spread radially outwardly. A strain evaluating unit 344 for evaluating a strain of the cylindrical sleeve 28 based on a measured diametrical displacement thereof to determine whether the cylindrical sleeve 28 as it is spread is acceptable or not. Furthermore, an actuator device 345 is provided for inserting the rotor 16 together with the permanent magnets 26 into the cylindrical sleeve 28 as it is spread radially outwardly if the cylindrical sleeve 28 is determined as being acceptable.

Figure 21:
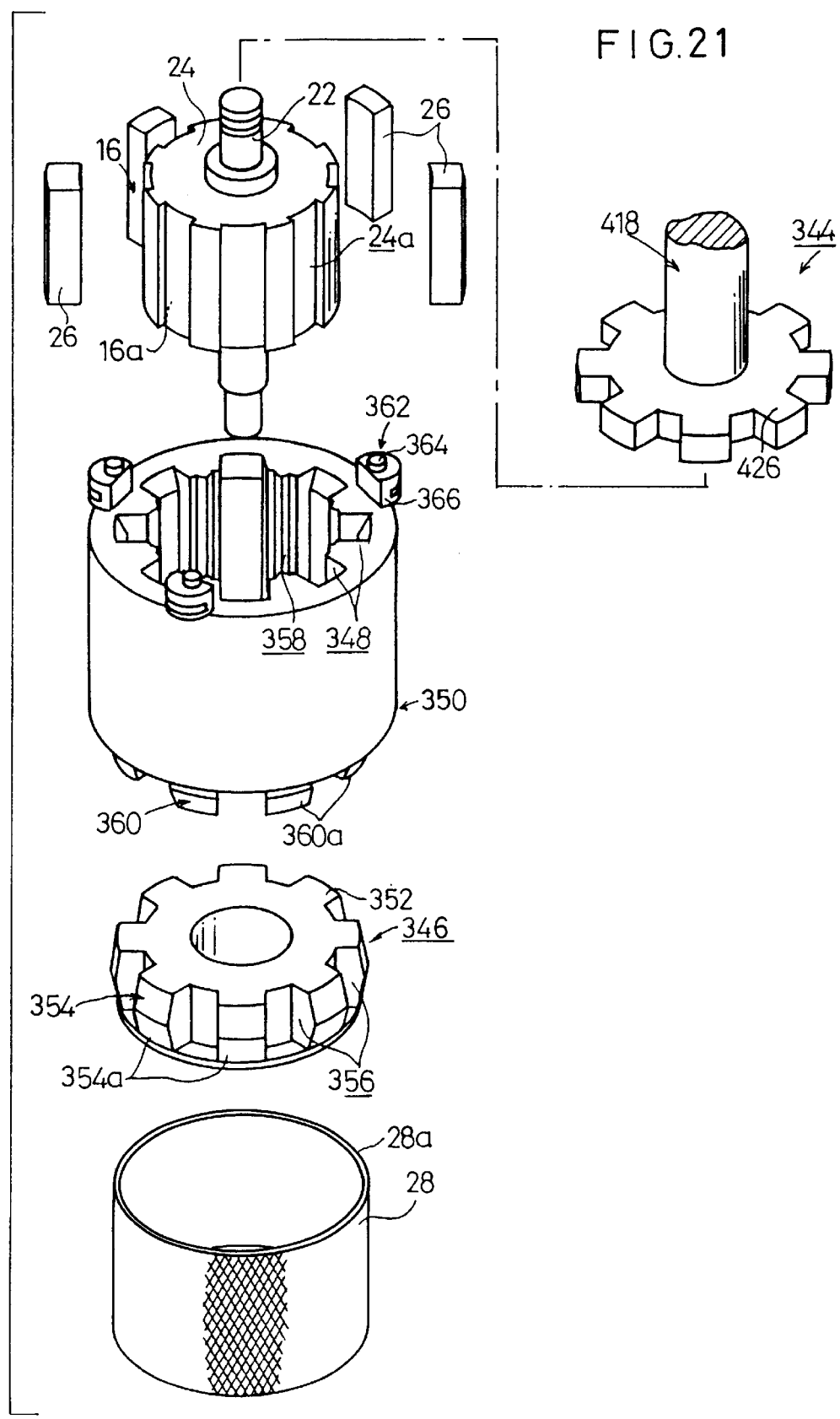
FIG. 21 is an exploded perspective view of a holder jig and a movable jig of the covering apparatus according to the third embodiment and a rotor.

As shown in FIG. 21, the covering apparatus 330 has a movable jig 346 for positioning and supporting an end face 16a of the rotor 16, and a holder jig 350 having a plurality of insertion grooves 348 for inserting therein the permanent magnets 26 disposed in the grooves 24a of the rotor 16. The holder jig 350 and the movable jig 346 are pressable together into an insertion end 28a of the cylindrical member 28 for spreading the insertion end 28a radially outwardly to a diameter greater than the diameter of a circle corresponding to inner wall surfaces of the insertion grooves 34.

The movable jig 346 is of a substantially disk shape and has an engaging surface 352 for placing the end face 16a of the rotor 16 thereon and a plurality of first teeth 354 projecting radially outwardly for positional alignment with the respective permanent magnets 26, with recesses 356 being defined between the first teeth 354. The first teeth 354 have their radially outermost edges circumscribed by a circle whose diameter is selected to spread the cylindrical sleeve 28 radially outwardly to a diameter greater than the diameter of a circle corresponding to inner wall surfaces of the insertion grooves 348. The first teeth 354 have smaller-diameter tapered surfaces 354a on their outer tip ends. The movable jig 346 may be replaced with the movable jig 202 according to the second embodiment.

The holder jig 350 is of a substantially cylindrical shape whose axial length corresponds to the length of the permanent magnets 26. The holder jig 350 has an axially extending through hole 358 defined therein for receiving the rotor 16 therein, with the insertion grooves 348 being held in communication with the through hole 358. The holder jig 350 has a plurality of second teeth 360 projecting downwardly from a lower end thereof and disposed in circumferentially spaced intervals. The second teeth 360 fit respectively into the recesses 356 of the movable jig 346, and have their respective outer edges circumscribed by a circle whose diameter is selected to spread the cylindrical sleeve 28 radially outwardly to a diameter greater than the diameter of a circle corresponding to the inner wall surfaces of the insertion grooves 348. The first teeth 354 and the second teeth 360 jointly serve to spread the cylindrical sleeve 28 radially outwardly as described above. The second teeth 360 have smaller-diameter tapered surfaces 360a on their outer tip ends.

A fixing device 362 is mounted on an outer circumferential edge of the upper end of the holder jig 350. The fixing device 362 comprises a plurality of circumferentially spaced pins 364 secured to the holder jig 350 and a plurality of semicircular retainers 366 rotatably mounted on the respective pins 364.

Figure 24:
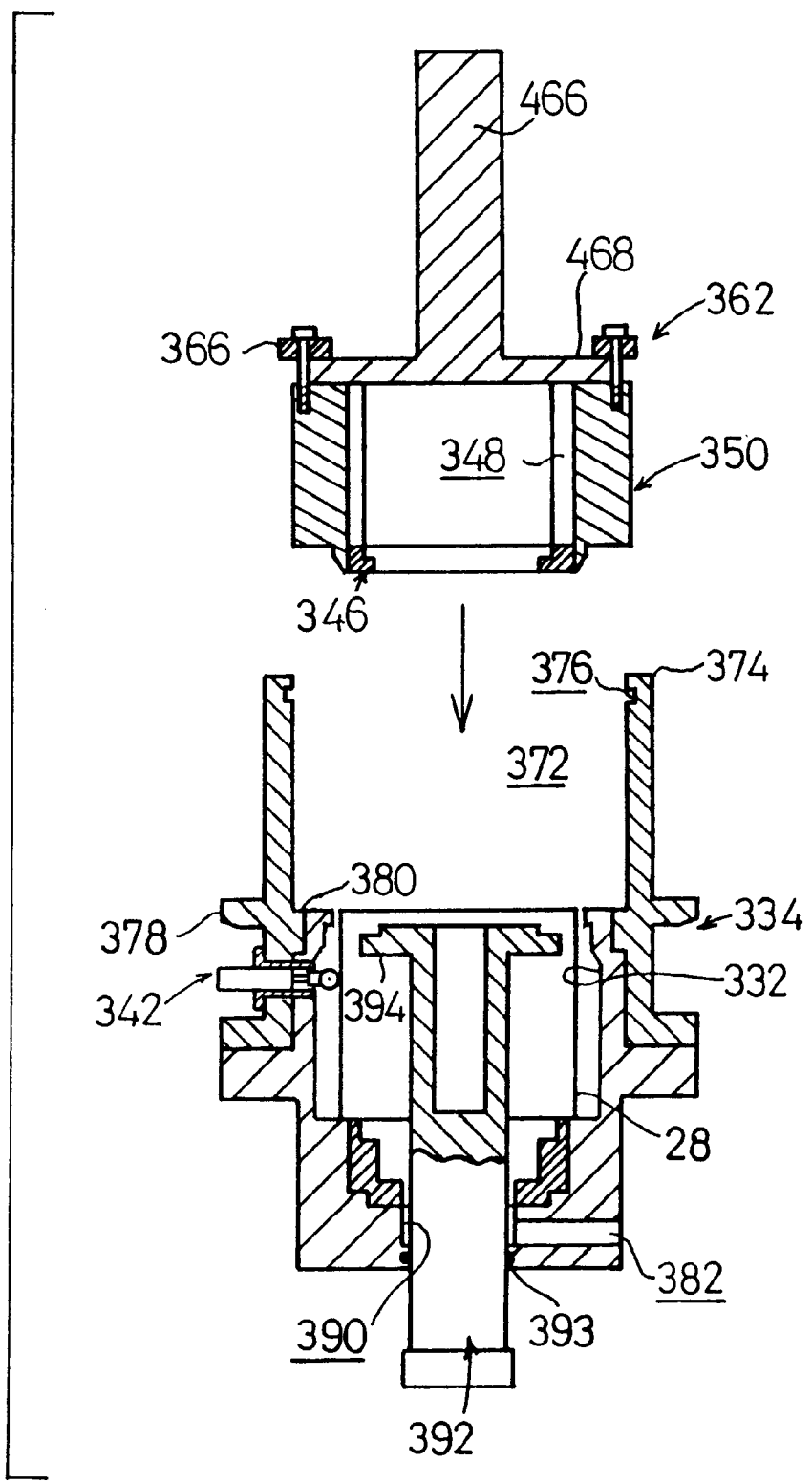
FIG. 24 is a vertical cross-sectional view showing the manner in which a cylindrical member is disposed in a first casing member in the covering apparatus according to the third embodiment.

The first casing member 334 is mounted on a base 370 and comprises a substantially cylindrical bottomed body having an upward opening 372 defined by an upward cylindrical wall 374 (see FIG. 24). The cylindrical wall 374 has a clearance groove 376 defined fully circumferentially in an inner circumferential surface near an upper edge thereof. An outwardly projecting annular flange 378 and an inwardly projecting annular ledge 380 are defined on a lower end thereof.

The spreading device 340 comprises a fluid passage 382 defined horizontally in a lower end portion of the first casing member 334. A pipe 384 (see FIG. 19) has an end connected to the fluid passage 382 and an opposite end connected to a hydraulic pump 388 which can be controlled by a controller 386. As shown in FIG. 24, the fluid passage 382 communicates with the interior space of the first casing member 334 through a hole 390 defined centrally in the lower end portion of the first casing member 334. The actuator device 345 includes a lower setting member 392 slidably inserted in the hole 390 and hermetically sealed by an O-ring 393 (see FIG. 24) held on a cylindrical wall which defines the hole 390.

The lower setting member 392 comprises a substantially cylindrical body with a large-diameter flange 394 on its upper end. The lower setting member 392 has a lower end projecting from the lower end of the first casing member 334 and connected to the upper end of a rod 398 (see FIGS. 19 and 20) which extends upwardly from a lifting cylinder 396. The lifting cylinder 396 is coupled to the hydraulic pump 388 through pipes 397a, 397b.

Figure 22:
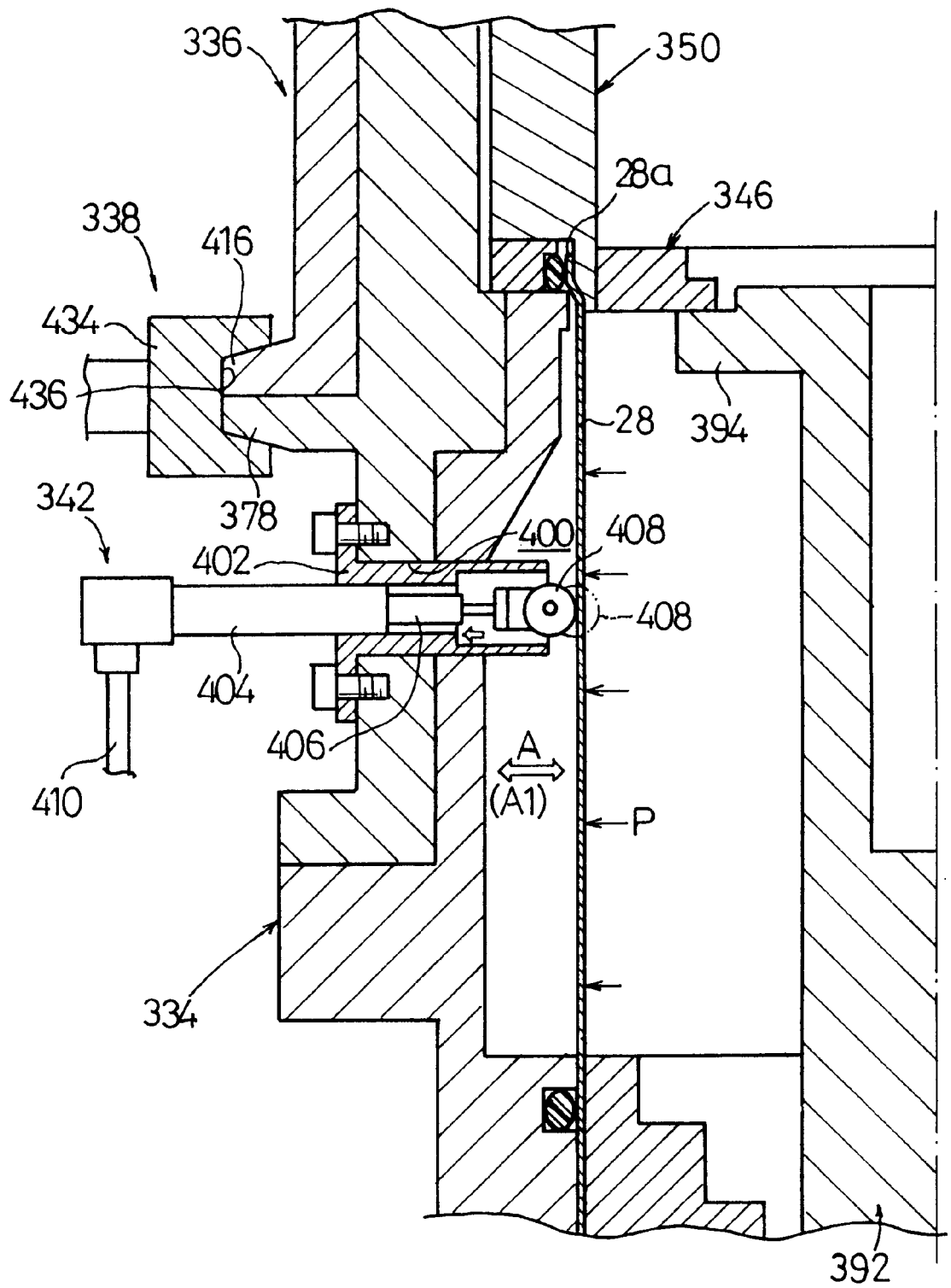
FIG. 22 is an enlarged fragmentary vertical cross-sectional view of a measuring device and a first casing member of the covering apparatus according to the third embodiment.

As shown in FIG. 22, the measuring device 342 comprises a plurality of holes 400 defined radially through a side wall of the first casing member 334 at equally angularly spaced locations (i.e., 120°-spaced locations), a plurality of cylindrical support members 402 inserted respectively in the holes 400 and fastened to the side wall of the first casing member 334, a plurality of length measuring units 404 mounted on the respective support members 402, a plurality of detector rods 406 projecting from the respective length measuring units 404 for movement toward and away from the center of the first casing member 334, and a plurality of roller feelers (rotors) 408 rotatably supported on tip ends of the respective detector rods 406.

Each of the length measuring units 404 comprises a magnescale, and has a resilient member (not shown) through which the detector rod 406 is supported for movement in the directions indicated by the arrow A. The length measuring unit 404 has cables 410 connected to a calculating unit 412 (see FIG. 19). The calculating unit 412 calculates, as a strain δ, a diametrical displacement of the cylindrical sleeve 28 as detected by each of the length measuring units 404, and sends the calculated strain δ to the strain evaluating unit 344.

The strain evaluating unit 344 determines whether the calculated strain δ falls in a predetermined tolerance range or not, and delivers the result to the controller 386. Specifically, as shown in FIG. 23, the strain evaluating unit 344 decides that the cylindrical sleeve 28 is acceptable if the calculated strain δ falls in the tolerance range between upper and lower strain limits δ1, δ2 when a given hydraulic pressure P is applied to the cylindrical sleeve 28 by the spreading device 340.

Figure 27:
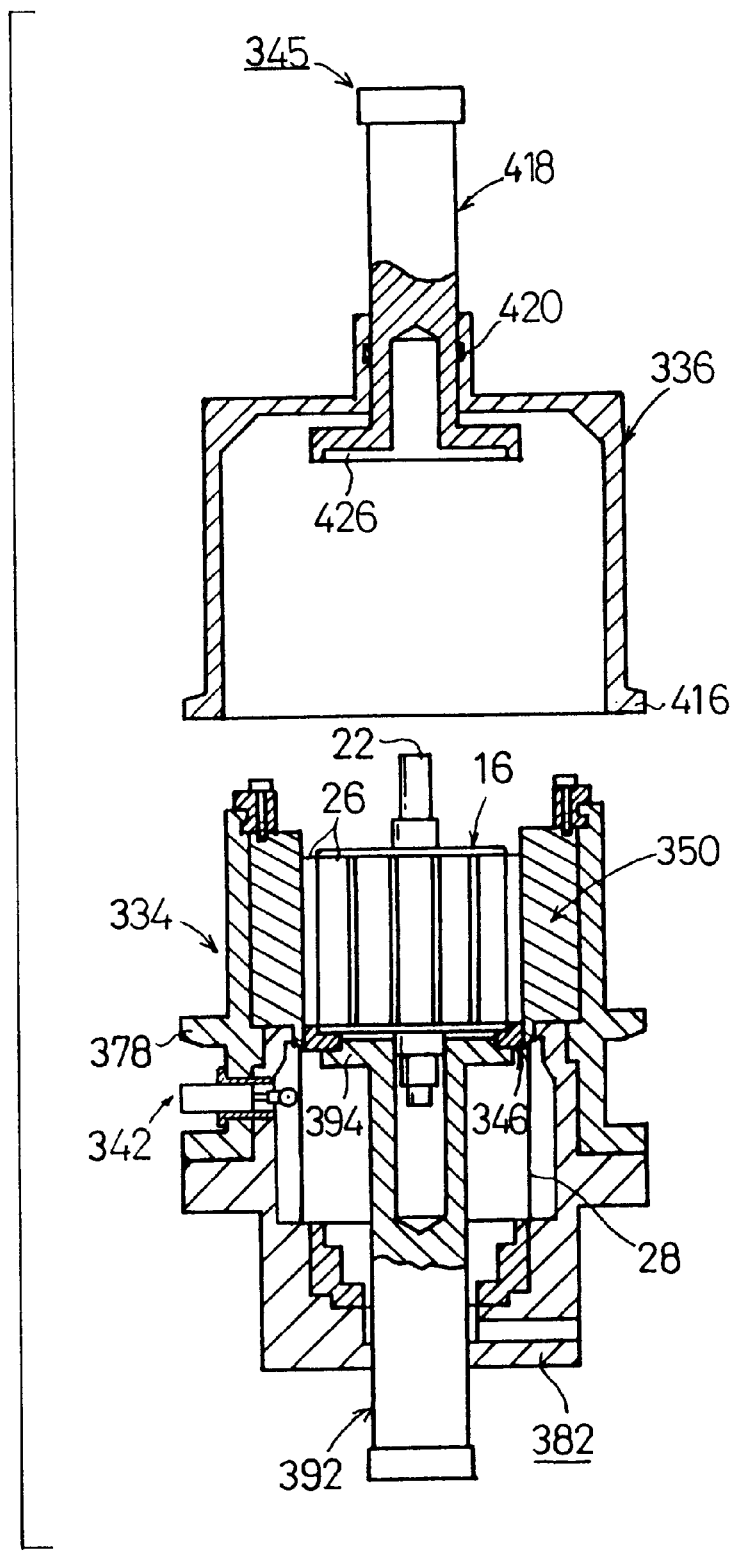
FIG. 27 is a vertical cross-sectional view showing the manner in which the rotor and the permanent magnets are disposed on the first casing member in the covering apparatus according to the third embodiment.

The second casing member 336 is supported by a turning unit (described later on), and comprises a substantially cylindrical bottomed body having a downward opening 414 and an outwardly projecting annular engaging flange 416 on a lower end thereof. The actuator device 345 also comprises an upper setting member 418 slidably inserted in the upper end of the second casing member 336 and hermetically sealed by an O-ring 420 (see FIG. 27) held on an upwardly projecting cylindrical wall of the second casing member 336. The upper setting member 418 has an upper end coupled to the lower end of a rod 424 (see FIGS. 19 and 20) which extends downwardly from a pressing cylinder 422 mounted on the turning unit.

The upper setting member 418 has a large-diameter flange 426 (see FIGS. 20 and 27) on a lower end thereof which is held in engagement with an upper end wall of the second casing member 336 for thereby holding the second casing member 336. The pressing cylinder 422 is coupled to the hydraulic pump 388 through pipes 428a, 428b (see FIG. 19).

The clamping device 338 comprises a plurality of cylinders 430 fixedly mounted on the base 370 and having respective rods 432 projecting toward the center of the first casing member 334, with clamps 434 coupled to the respective rods 432. The clamps 434 have respective grippers 436 on their distal ends for gripping the flange 378 of the first casing member 334 and the flange 416 of the second casing member 336 to hermetically hold the first and second casing members 334, 336 together.

A delivery device 440 (see FIGS. 19 and 20) has a lifting/lowering cylinder 442 coupled to the hydraulic pump 388 through pipes 444a, 444b (see FIG. 19). The lifting/lowering cylinder 442 has an upwardly extending rod 446 joined to a guide rod 448 which is vertically movably guided by a guide cylinder 449 mounted on the base 370. A turning unit 450 is angularly movably mounted on the guide rod 448 which has an upper end to which a turning motor 454 is affixed by an attachment 452. The turning motor 454 has a downwardly extending rotatable shaft 456 to which there is secured a first gear 458 held in mesh with a large-diameter second gear 460 of the turning unit 450.

The turning unit 450 has a first attachment arm 462 and a second attachment arm 464 which are angularly spaced from each other by a predetermined angle. The pressing cylinder 422 of the actuating device 345, which is oriented downwardly, is fixedly mounted on the first attachment arm 462. A downwardly extending jig delivery support rod 466 is mounted on the second attachment arm 464 and has a large-diameter disk 468 on its lower end. The holder jig 350 and the movable jig 346 are detachably held by the support rod 466.

Operation of the covering apparatus 330 will be described below.

As shown in FIG. 24, with the lower setting member 392 being elevated, the cylindrical sleeve 28 is placed in the first casing member 334 and radially spaced the gap from the inner circumferential surface 332 of the first casing member 334.

As shown in FIG. 22, the rotatable roller feeler 408 is mounted on the tip end of the detector rod 406, which is movable in the directions of the arrow A through the resilient member (not shown), in each of the length measuring units 404 of the measuring device 342. When the lower end of the cylindrical sleeve 28 contacts the roller feelers 408 at the time the cylindrical sleeve 28 is placed in the first casing member 334, the roller feelers 408 move toward the length measuring units 404 in the direction indicated by the arrow A1, i.e., from the two-dot-and-dash-line position to the solid-line position in FIG. 22, while rotating in contact with the cylindrical sleeve 28. Therefore, the cylindrical sleeve 28 is smoothly and reliably inserted into the first casing member 334 without being resisted by the roller feelers 408.

Thereafter, the holder jig 350 and the movable jig 346 are delivered together by the delivery device 440. At this time, the holder jig 350 is supported on the large-diameter disk 468 of the support rod 466 by the retainers 366, and the second teeth 360 of the holder jig 350 fit respectively in the recesses 356 of the movable jig 346, which is held by the holder jig 350 under frictional forces.

Figure 25:
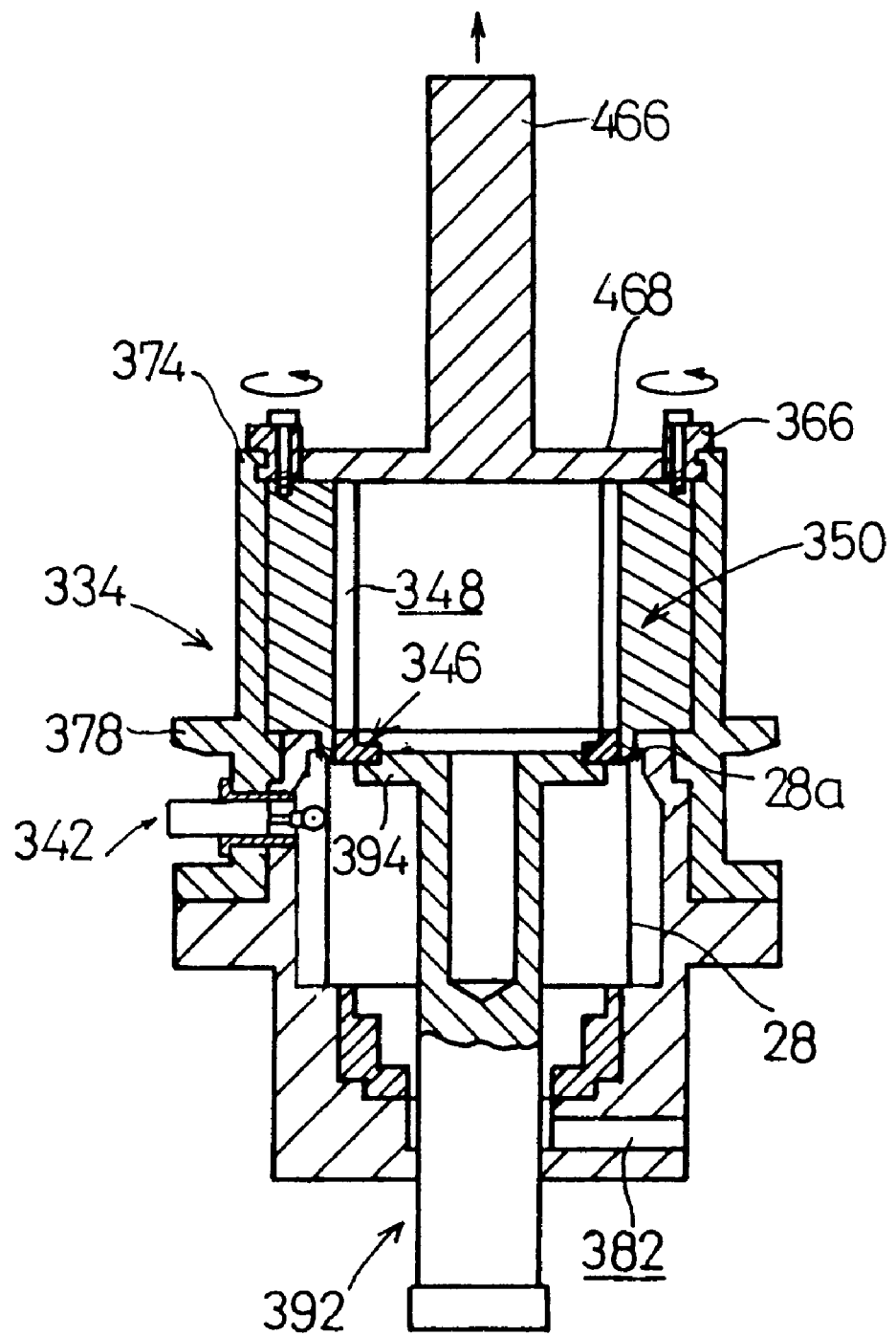
FIG. 25 is a vertical cross-sectional view showing the manner in which the holder jig and the movable jig are disposed in the first casing member in the covering apparatus according to the third embodiment.

The turning motor 454 is energized to cause the first and second gears 458, 460 to turn the turning unit 450 a predetermined angle until the support rod 466 is aligned with the first casing member 334. Then, the lifting/lowering cylinder 442 is actuated to lower the guide rod 448 in unison with the rod 446. The first and second teeth 354, 360 of the movable and holder jigs 346, 350 which are held by the support rod 466 are inserted into the end 28a of the cylindrical sleeve 28 while spreading it radially outwardly, as shown in FIG. 25.

The retainers 366 are then angularly moved about the respective pins 364 into engagement with the upper end of the cylindrical wall 374 of the first casing member 334 by inserting their portions into the clearance groove 376 and out of engagement with the large-diameter disk 468 of the support rod 466. The holder jig 350 is now held in the first casing member 334, and the movable jig 350 is placed on the large-diameter flange 394 of the lower setting member 392. The lifting/lowering cylinder 442 is actuated to lift the support rod 466 only.

Figure 26:
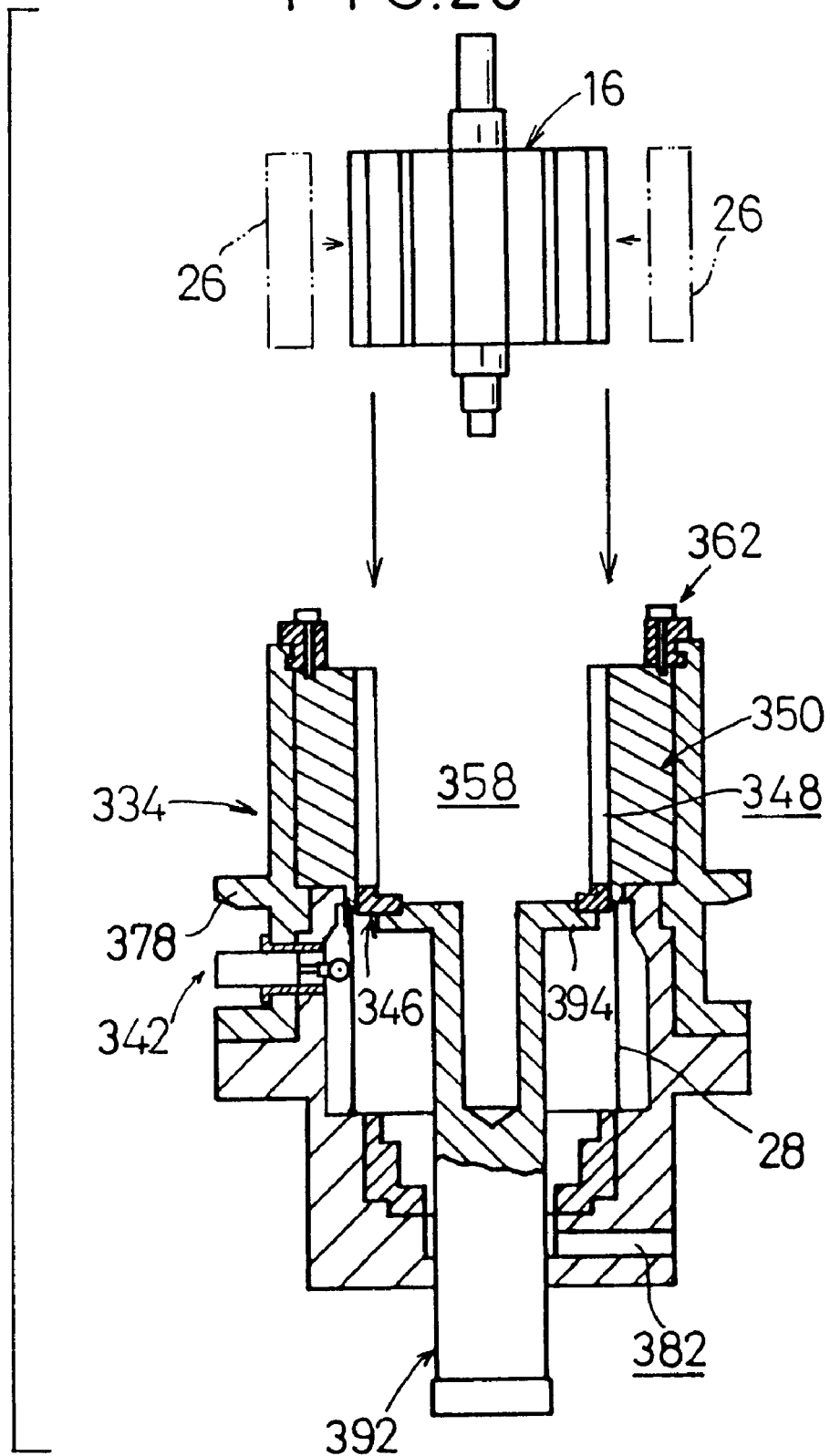
FIG. 26 is a vertical cross-sectional view showing the manner in which a rotor and permanent magnets are about to be disposed on the first casing member in the covering apparatus according to the third embodiment.

As shown in FIG. 26 the rotor 16 and the permanent magnets 26 which are positioned respectively in the grooves 24a are inserted into the through hole 358 and the insertion grooves 348, respectively, in the holder jig 350. The end face 16a of the rotor 16 is positioned and supported on the engaging surface 352 of the movable jig 346, and the permanent magnets 26 are aligned with the respective first teeth 354 of the movable jig 346 (see FIG. 27).

Thereafter, the second casing member 336 is brought to a position above the first casing member 334 by the turning motor 454 (see FIG. 27), and then lowered into engagement with the first casing member 334 by the lifting/lowering cylinder 442. The flange 378 of the first casing member 334 and the flange 416 of the second casing member 336 abut against each other, and are gripped together by the grippers 436 of the clamps 434 which are actuated by the cylinders 430 of the clamping device 338. The first casing member 334 and the second casing member 336 are now hermetically joined to each other (see FIG. 28).

Figure 28:
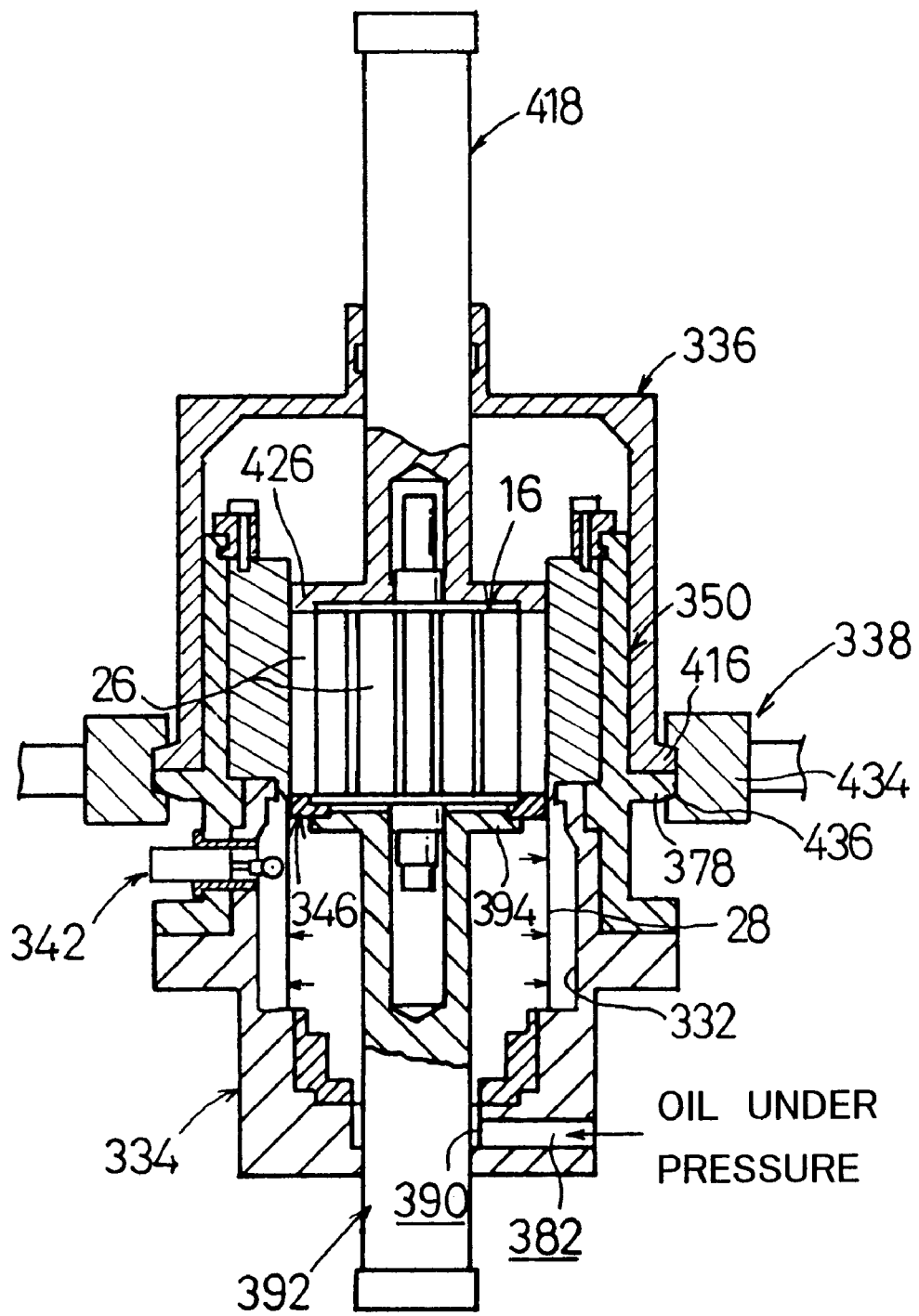
FIG. 28 is a vertical cross-sectional view showing the manner in which a second casing member is coupled to the first casing member and oil is supplied under pressure into the first and second casing members in the covering apparatus according to the third embodiment.
Figure 29:
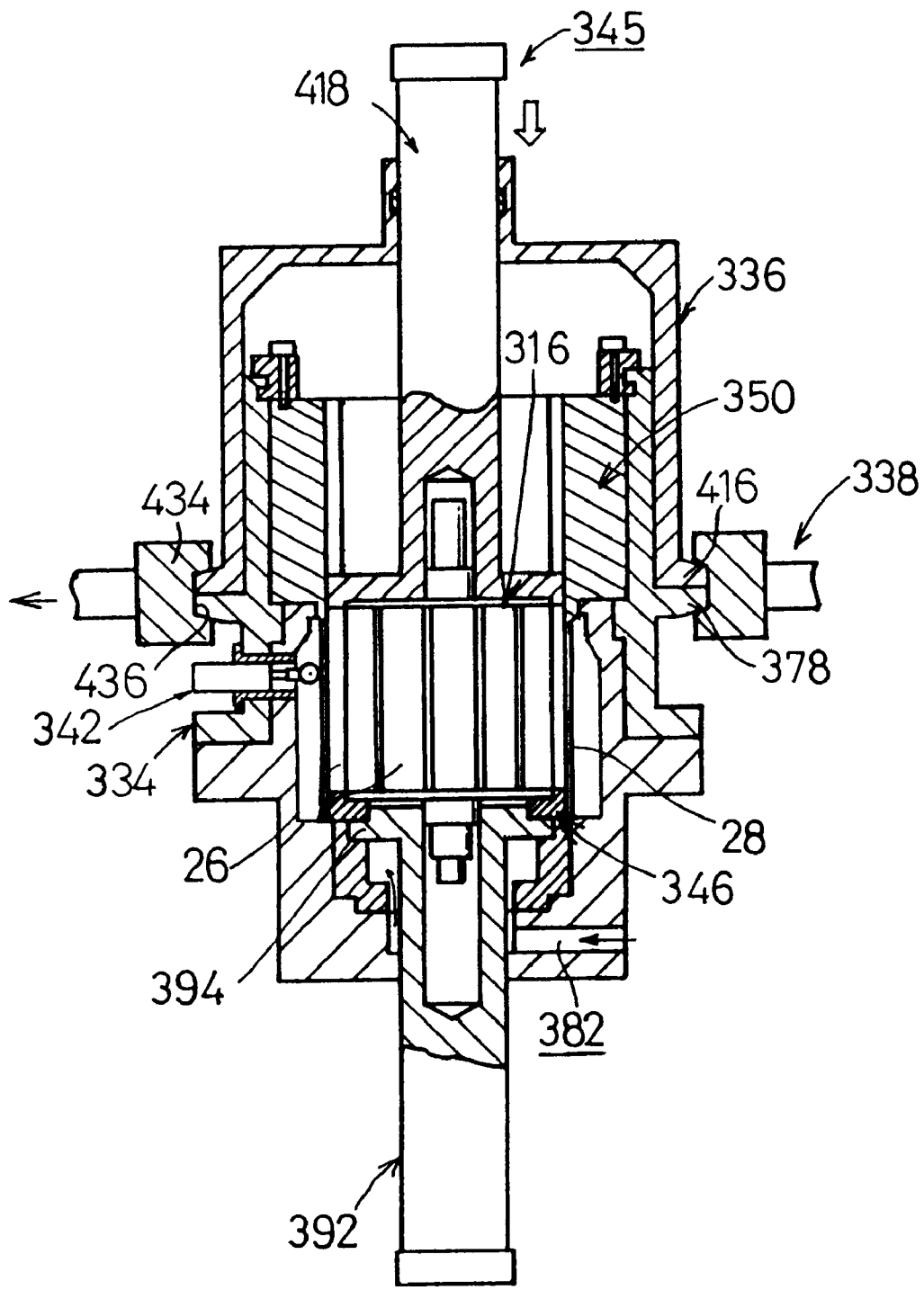
FIG. 29 is a vertical cross-sectional view showing the manner in which the rotor has been pressed into the cylindrical member in the covering apparatus according to the third embodiment.

Then, as shown in FIG. 28, when oil under pressure is supplied from the hydraulic pump 388 (FIG. 19) through the pipe 384 to the fluid passage 382 of the spreading device 340, the supplied oil under pressure is introduced through the hole 390 into the first casing member 334. The cylindrical sleeve 28 disposed in the first casing member 334 is now pressed under the oil pressure against the inner circumferential surface 332 of the first casing member 334, and spread radially outwardly across the gap.

As shown in FIG. 22, when the oil pressure P is applied to the cylindrical sleeve 28, the cylindrical sleeve 28 is spread radially outwardly and deformed in the direction indicated by the arrow A1. Therefore, the roller feelers 408 are pressed by the cylindrical sleeve 28 and displaced radially outwardly in unison with the detector rods 406 in the direction indicated by the arrow A1, whereupon the length measuring units 404 detect the radially outward displacement of the cylindrical sleeve 28. The displacement detected by each of the length measuring units 404 is sent through the cables 410 to the calculating unit 412, which calculates a diametrical strain $\delta$ of the cylindrical sleeve 28. The calculated strain $\delta$ is then supplied to the strain evaluating device 344, which determines whether the calculated strain $\delta$ falls in the tolerance range (see FIG. 23) or not. The result is delivered from the strain evaluating device 344 to the controller 386.

If the calculated strain $\delta$ falls in the tolerance range, i.e., if the cylindrical sleeve 28 is acceptable, then the controller 386 actuates the pressing cylinder 422 while the cylindrical sleeve 28 is being spread radially outwardly, and either actuates the lifting cylinder 396 to move its rod 398 downwardly or deactivate the lifting cylinder 396. The upper setting member 418 coupled to the rod 424 is lowered, causing the large-diameter flange 426 thereof to press the rotor 16 and the permanent magnets 26 downwardly in unison. Since the rotor 16 and the permanent magnets 26 are placed on the movable jig 346, the rotor 16 and the permanent magnets 26 descend in unison with the movable jig 346 into the cylindrical sleeve 28 which has been spread radially outwardly under the oil pressure. At this time, excessive oil in the first casing member 334 is forced into the second casing member 336 through the clearance between the rotor 16 and the holder jig 350.

After the rotor 16 and the permanent magnets 26 are inserted into the cylindrical sleeve 28, the oil under pressure in the first casing member 334 is returned through the fluid passage 382 and the pipe 384 to the hydraulic pump 388. The pressure in the first casing member 334 is lowered to the atmospheric pressure, allowing the cylindrical sleeve 28 to shrink radially inwardly into covering relation to the permanent magnets 26. Then, the clamping device 338 is operated to displace the clamps 434 away from the first and second casing members 334, 336, and the second casing member 336 is lifted by the lifting/lowering cylinder 442.

Figure 30:
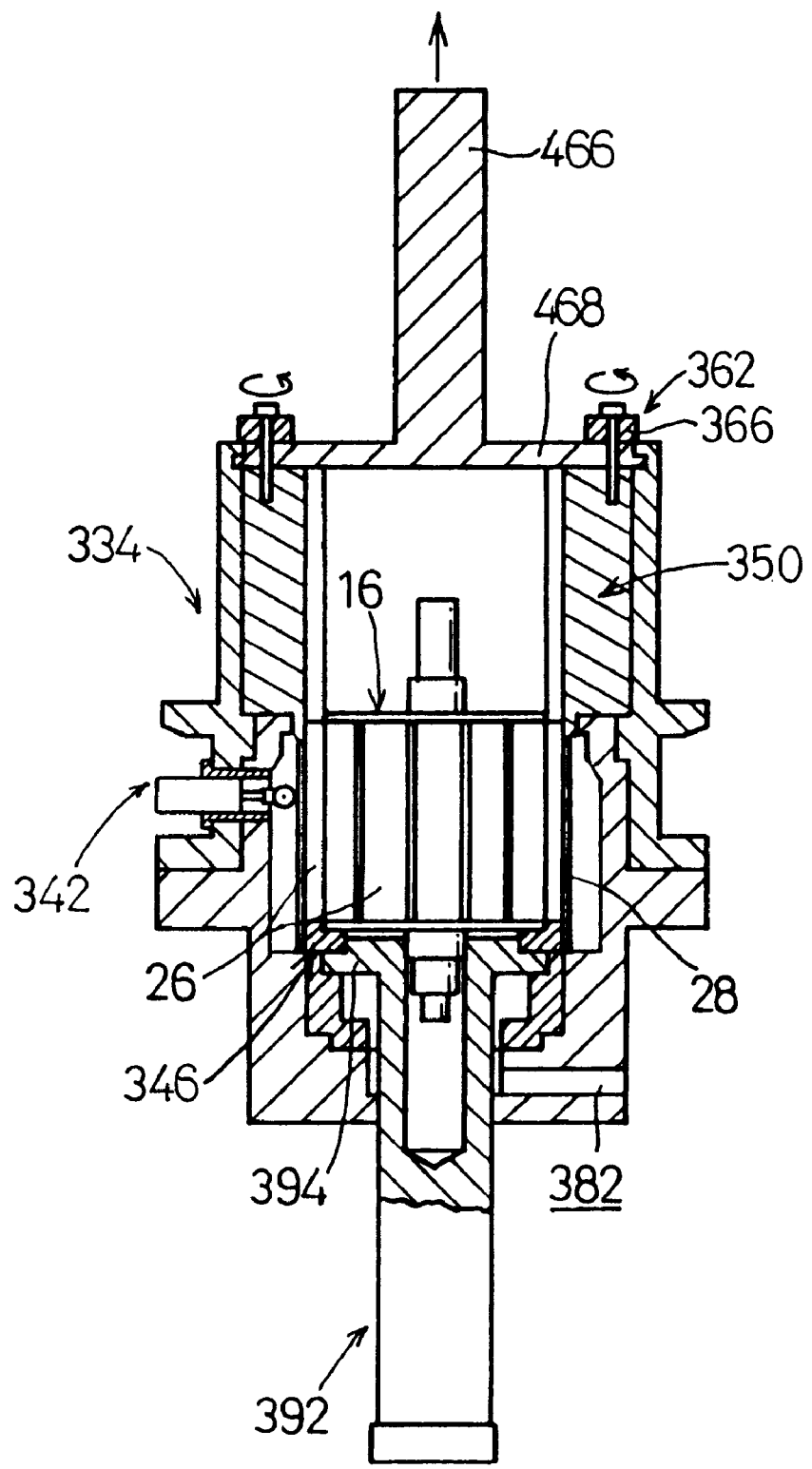
FIG. 30 is a vertical cross-sectional view showing the manner in which the holder jig is removed from the first casing member in the covering apparatus according to the third embodiment.

Thereafter, as shown in FIG. 30, the support rod 466 of the delivery device 440 is placed on the first casing member 334, and the retainers 366 are turned to hold the holder jig 350 on the support rod 466. The support rod 466 and the holder jig 350 are elevated together away from the first casing member 334, after which the lifting cylinder 396 is actuated to elevate the lower setting member 392 and the rotor 16 (see FIG. 31) out of the first casing member 334.

Figure 31:
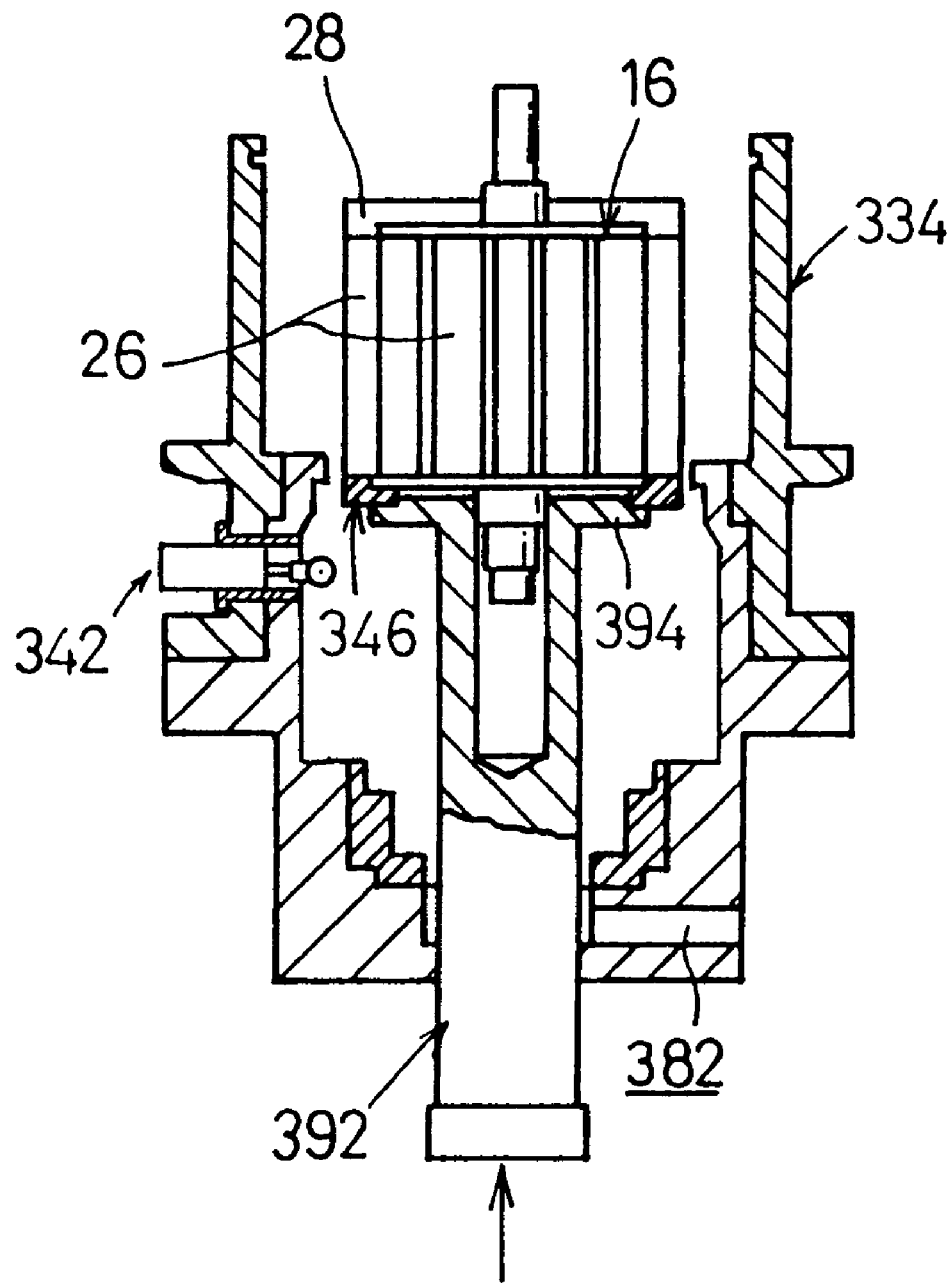
FIG. 31 is a vertical cross-sectional view showing the manner in which the rotor covered with the cylindrical member is taken out of the first casing member in the covering apparatus according to the third embodiment.
Figure 32:
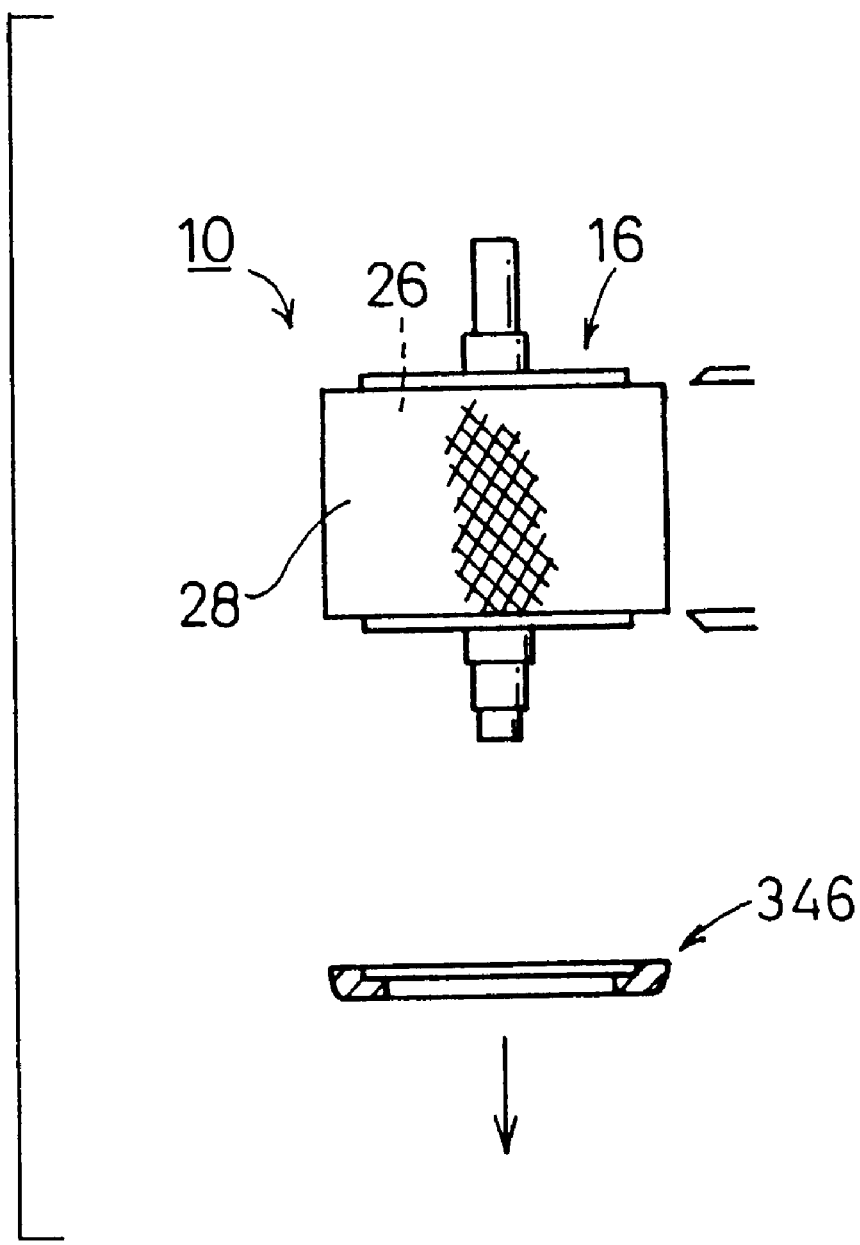
FIG. 32 is an elevational view showing the manner in which excessive portions of the cylindrical member are cut off from the covered rotor in the covering apparatus according to the third embodiment.
Figure 33A:
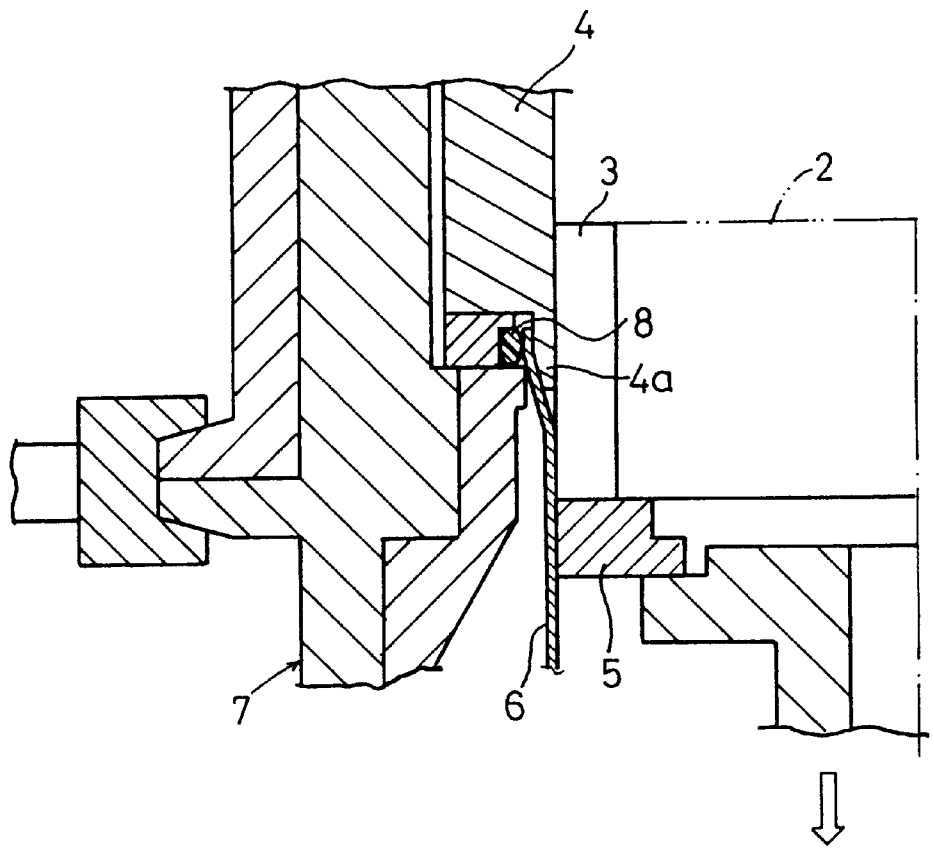
FIG. 33A is an enlarged fragmentary vertical cross-sectional view of a conventional covering apparatus.
Figure 33B:
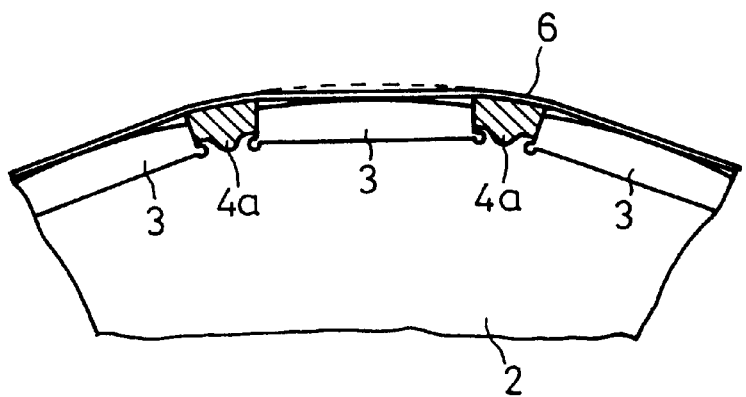
FIG. 33B is a fragmentary plan view, partly in cross section, of the conventional covering apparatus.

Then, as shown in FIG. 31, excess ends of the cylindrical sleeve 28 which extend axially outwardly beyond the opposite ends of the rotor 16 are cut off by cutters, and the movable jig 346 is removed from the rotor 16. The process of covering the permanent magnets 26 on the rotor 16 with the cylindrical member 28 is now completed.

In the third embodiment, while the cylindrical sleeve 28 is being spread radially outwardly under the fluid pressure by the spreading device 340, the diametrical displacement of the cylindrical sleeve 28 is measured by the length measuring units 404 of the measuring device 342. The measured displacement is sent to the calculating unit 412, which calculates the diametrical strain which the cylindrical sleeve 28 is being subjected to. Based on the calculated diametrical strain, the strain evaluating unit 344 determines whether the strain falls in the tolerance range or not, i.e., whether the cylindrical sleeve 28 is acceptable or not.

If the cylindrical sleeve 28 is acceptable, then the actuating device 345 is actuated to press the rotor 16 and the permanent magnets 26 to perform the process of covering the permanent magnets 26 with the cylindrical sleeve 28. If the cylindrical sleeve 28 is not acceptable, then the process of radially outwardly spreading the cylindrical sleeve 28 is stopped.

Therefore, only a cylindrical sleeve 28 which can exert desired tightening forces can be selected to cover the permanent magnets 26. As a result, the permanent magnets 26 covered with the cylindrical sleeve 28 are prevented from rising off the outer circumferential surface of the rotor 16 due to a lack of tightening forces, or from being erroneously inserted due to an excess of tightening forces. The permanent magnets 26 disposed on the outer circumferential surface of the rotor 16 are thus reliably and efficiently covered with the cylindrical sleeve 28 which has desired tightening forces, and the process of covering the permanent magnets 26 with the cylindrical sleeve 28 is made efficient with ease.

In the above third embodiment, the fluid passage 382 of the spreading device 340 is defined in the first casing member 334. However, a fluid passage 382a may be defined in the second casing member 336 instead of or in addition to the fluid passage 382, and may be connected to the hydraulic pump 388 through a pipe indicated by the two-dot-and-dash lines in FIG. 19.

With the covering method and the covering apparatus according to the first embodiment of the present invention, after the rotor with the permanent magnets disposed on its outer circumferential surface is inserted in the holder jig while the insertion end of the cylindrical sleeve is being spread radially outwardly, the rotor and the permanent magnets are inserted into the cylindrical sleeve under the guidance of the holder jig. The resilient members placed in the insertion grooves of the holder jig prevent the permanent magnets from contacting the inner wall surfaces of the insertion grooves and hence from being damaged when the rotor and the permanent magnets are inserted into the holder jig. The permanent magnets are smoothly inserted into the cylindrical sleeve while being resiliently pressed by the resilient members.

The permanent magnets do not need to be secured to the rotor in advance. Therefore, no adhesive is necessary to bond the permanent magnets to the rotor, and hence the cost of the motor rotor may be reduced. The covering process can efficiently be performed to produce high-quality motor rotors.

With the covering apparatus according to the second embodiment, the first teeth of the movable jig have the radially outwardly projecting edges which project radially outwardly of the second teeth of the holder jig. Therefore, when the movable jig is inserted together with the rotor and the permanent magnets into the cylindrical sleeve, the cylindrical sleeve is further spread radially outwardly by the radially outwardly projecting edges of the first teeth of the movable jig. Consequently, the cylindrical sleeve which is reduced in diameter from the first teeth toward the second teeth of the holder jig is not held in sliding contact with the permanent magnets. The permanent magnets and the cylindrical sleeve are thus prevented from being damaged, and the permanent magnets can smoothly and efficiently be covered with the cylindrical sleeve, through a relatively simple structure.

With the covering method and the covering apparatus according to the third embodiment of the present invention, only a cylindrical sleeve which can exert desired tightening forces can be selected to cover the permanent magnets. As a result, the permanent magnets covered with the cylindrical sleeve are prevented from rising off the outer circumferential surface of the rotor due to a lack of tightening forces, or from being erroneously inserted due to an excess of tightening forces. The permanent magnets disposed on the outer circumferential surface of the rotor are thus reliably and efficiently covered with the cylindrical sleeve which has desired tightening forces, and the process of covering the permanent magnets with the cylindrical sleeve is made efficient with ease.

Although certain preferred embodiments of the present invention has been shown and described in detail, it should be understood that various changes and modifications may be made therein without departing from the scope of the appended claims.

What is claimed is:

1. An apparatus for covering a plurality of permanent magnets disposed at angularly spaced intervals on an outer circumferential surface of a rotor with a cylindrical sleeve, comprising:

a movable jig for positioning and supporting an end face of the rotor;

a holder jig having a plurality of insertion grooves for inserting therein the permanent magnets disposed on the outer circumferential surface of the rotor, said holder jig and said movable jig being pressable partly into an insertion end of the cylindrical sleeve to spread said insertion end radially outwardly to a diameter greater than the diameter of inner wall surfaces of said insertion grooves;

a plurality of resilient members disposed in said insertion grooves for pressing said permanent magnets against the outer circumferential surface of the rotor; and pressing means for inserting the movable jig and the rotor and the permanent magnets which are held in engagement with the movable jig into said cylindrical sleeve under the guidance of said holder jig.

2. An apparatus according to claim 1, wherein said resilient members comprise pairs of resilient members which are disposed in respective corners of the inner wall surfaces of said insertion grooves.

3. An apparatus according to claim 1, wherein said resilient members comprise rubber rods having a circular cross-sectional shape.

4. An apparatus according to claim 1, wherein said insertion grooves have respective radially outwardly tapered surfaces near an end thereof from which said rotor is inserted.

5. An apparatus according to claim 1, wherein said movable jig comprises:

an engaging surface for placing the end face of the rotor thereon; and a plurality of first teeth positioned for alignment with the permanent magnets, respectively, said first teeth having on respective tip ends thereof respective tapered surfaces which are progressively reduced in diameter in a direction in which the movable jig is inserted into the cylindrical sleeve.

6. An apparatus according to claim 1, wherein said holder jig has a plurality of second teeth alternating with said insertion grooves and extending axially of said holder jig, said second teeth having on respective tip ends thereof respective tapered surfaces which are progressively reduced in diameter in a direction in which the holder jig is inserted into the cylindrical sleeve.

7. An apparatus according to claim 1, further comprising fixing means mounted on an outer circumferential edge of an end of the holder jig for removably holding said holder jig on delivery means for delivering the holder jig.

8. An apparatus according to claim 1, further comprising:

a first casing member for inserting said cylindrical sleeve therein, said first casing member having an inner circumferential surface which will be spaced a gap from the outer circumferential surface of the cylindrical sleeve placed in the first casing member;

a second casing member movable with respect to said first casing member;

clamping means for hermetically coupling the first casing member and the second casing member with the cylindrical sleeve and the rotor housed therein; and fluid supply means for pressing said cylindrical sleeve against said inner circumferential surface under a fluid pressure to spread said cylindrical sleeve radially outwardly.

9. An apparatus for covering a plurality of permanent magnets disposed at angularly spaced intervals on an outer circumferential surface of a rotor with a cylindrical sleeve, comprising:

a holder jig having a plurality of insertion grooves for inserting therein the permanent magnets disposed on the outer circumferential surface of the rotor, and a plurality of second teeth disposed between said insertion grooves and pressable into an insertion end of the cylindrical sleeve to spread said insertion end radially outwardly to a diameter greater than the diameter of inner wall surfaces of said insertion grooves; and a movable jig having a plurality of first teeth for positioning and supporting an end face of said rotor and a plurality of recesses alternating with the first teeth for alignment with said second teeth, respectively, said movable jig being insertable together with said rotor and said permanent magnets into said cylindrical sleeve;

said first teeth and said second teeth being pressable together into the insertion end of the cylindrical sleeve, said first teeth having respective edges projecting radially outwardly beyond said second teeth.

10. An apparatus according to claim 9, further comprising pressing means for inserting the movable jig and the rotor and the permanent magnets which are held in engagement with the movable jig into said cylindrical sleeve under the guidance of said holder jig.

11. An apparatus according to claim 9, further comprising:

a first casing member for inserting said cylindrical sleeve therein, said first casing member having an inner circumferential surface which will be spaced a gap from the outer circumferential surface of the cylindrical sleeve placed in the first casing member;

a second casing member movable with respect to said first casing member;

clamping means for hermetically coupling the first casing member and the second casing member with the cylindrical sleeve and the rotor housed therein; and fluid supply means for pressing said cylindrical sleeve against said inner circumferential surface under a fluid pressure to spread said cylindrical sleeve radially outwardly.

12. An apparatus for covering a plurality of permanent magnets disposed at angularly spaced intervals on an outer circumferential surface of a rotor with a cylindrical sleeve, comprising:

spreading means for supplying a fluid under pressure into the cylindrical sleeve to spread the cylindrical sleeve radially outwardly;

measuring means for measuring a diametrical displacement of the cylindrical sleeve when the cylindrical sleeve is spread radially outwardly, said measuring means including:

a rotor rollingly engagable with an outer circumferential surface of said cylindrical sleeve; and a length measuring unit for detecting the diametrical displacement of the cylindrical sleeve based on a displacement of said rotor, evaluating means for determining whether said cylindrical sleeve is acceptable or not based on the diametrical displacement measured by said measuring means; and actuating means for inserting said rotor and said permanent magnets into said cylindrical sleeve while the cylindrical sleeve is being spread radially outwardly if said cylindrical sleeve is determined as being acceptable.

13. An apparatus according to claim 12, further comprising:

a movable jig for positioning and supporting an end face of the rotor; and a holder jig having a plurality of insertion grooves for inserting therein the permanent magnets disposed on the outer circumferential surface of the rotor, said holder jig and said movable jig being pressable partly into an insertion end of the cylindrical sleeve to spread said insertion end radially outwardly to a diameter greater than the diameter of inner wall surfaces of said insertion grooves.

14. An apparatus according to claim 13, wherein said movable jig comprises:

an engaging surface for placing the end face of the rotor thereon; and a plurality of first teeth positioned for alignment with the permanent magnets, respectively, said first teeth having on respective tip ends thereof respective tapered surfaces which are progressively reduced in diameter in a direction in which the movable jig is inserted into the cylindrical sleeve.

15. An apparatus according to claim 13, wherein said holder jig has a plurality of second teeth alternating with said insertion grooves and extending axially of said holder jig, said second teeth having on respective tip ends thereof respective tapered surfaces which are progressively reduced in diameter in a direction in which the holder jig is inserted into the cylindrical sleeve.

16. An apparatus according to claim 1, wherein said holder jig has an axial length generally the same as the length of the permanent magnets.

17. An apparatus according to claim 9, wherein said holder jig has an axial length generally the same as the length of the permanent magnets.

18. An apparatus according to claim 12, wherein said holder jig has an axial length generally the same as the length of the permanent magnets.

* * * * *